US011410643B2

(12) United States Patent
Andreas et al.

(10) Patent No.: US 11,410,643 B2
(45) Date of Patent: Aug. 9, 2022

(54) RESPONSE GENERATION FOR CONVERSATIONAL COMPUTING INTERFACE

(71) Applicant: Microsoft Technology Licensing, LLC, Redmond, WA (US)

(72) Inventors: Jacob Daniel Andreas, San Francisco, CA (US); Jayant Sivarama Krishnamurthy, Berkeley, CA (US); Alan Xinyu Guo, Boston, MA (US); Andrei Vorobev, Bellevue, WA (US); John Philip Bufe, III, Somerville, MA (US); Jesse Daniel Eskes Rusak, Somerville, MA (US); Yuchen Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/657,675

(22) Filed: Oct. 18, 2019

(65) Prior Publication Data
US 2021/0050006 A1 Feb. 18, 2021

Related U.S. Application Data

(60) Provisional application No. 62/885,671, filed on Aug. 12, 2019.

(51) Int. Cl.
*G10L 15/22* (2006.01)
*G10L 15/18* (2013.01)
(Continued)

(52) U.S. Cl.
CPC ............ *G10L 15/1815* (2013.01); *G06F 9/54* (2013.01); *G06F 40/211* (2020.01); *G06N 7/005* (2013.01);
(Continued)

(58) Field of Classification Search
CPC .......... G10L 15/1815; G10L 15/22–2015/228; G06F 40/00–40/58; G06F 9/54; G06N 20/00; G06N 7/005
See application file for complete search history.

(56) References Cited

U.S. PATENT DOCUMENTS

| 10,469,306 B1* | 11/2019 | Boles | H04L 41/06 |
| 2014/0380286 A1* | 12/2014 | Gabel | G06N 5/022 |
| | | | 717/139 |

(Continued)

OTHER PUBLICATIONS

Sören Blom;Matthias Book;Volker Gruhn; Executable Semantics of Recursively Nestable Dialog Flow Specifications for Web Applications; 2008 Eighth International Conference on Web Engineering; pp. 135-147. (Year: 2008).*
"English Resource Grammar", Retrieved From: http://www.delph-in.net/erg/, May 23, 2013, 3 Pages.
Dušek, et al., "Findings of the E2E NLG Challenge", In repository of arXiv, arXiv:1810.01170v1, Oct. 2, 2018, 7 Pages.
(Continued)

*Primary Examiner* — Abul K Azad
(74) *Attorney, Agent, or Firm* — Alleman Hall Creasman & Tuttle LLP

(57) ABSTRACT

A computer-implemented method of responding to a conversational event. The method comprises enacting, by a conversational computing interface, an initial computer-executable plan based on a conversational event received by the conversational computing interface, wherein the initial computer-executable plan is configured to output an initial value based on the conversational event. The method further comprises selecting, by the conversational computing interface, an extended computer-executable plan based on determining that the initial value is insufficient for generating an extended description responsive to the conversational event. The method further comprises enacting, by the conversational computing interface, the extended computer-executable plan to output additional information beyond what the initial computer-executable plan is configured to output, the additional information sufficient for generating the extended
(Continued)

description responsive to the conversational event. The method further comprises outputting, via the conversational computing interface, a response to the conversational event including the extended description.

18 Claims, 11 Drawing Sheets

(51) Int. Cl.
    *G06F 9/54*     (2006.01)
    *G06N 7/00*     (2006.01)
    *G06N 20/00*     (2019.01)
    *G06F 40/211*     (2020.01)
    *G06F 40/253*     (2020.01)
    *G06F 40/295*     (2020.01)

(52) U.S. Cl.
    CPC .............. *G06N 20/00* (2019.01); *G10L 15/22* (2013.01); *G06F 40/253* (2020.01); *G06F 40/295* (2020.01); *G10L 2015/223* (2013.01)

(56) References Cited

U.S. PATENT DOCUMENTS

2018/0218293 A1*   8/2018   Schlesinger ......... G06Q 10/025
2019/0347321 A1*   11/2019   Chen ..................... G06F 40/186

OTHER PUBLICATIONS

Gallo, et al., "Directed Hypergraphs and Applications", In Journal of Discrete Applied Mathematics, vol. 42, Issue 2-3, Apr. 27, 1993, pp. 177-201.

\* cited by examiner

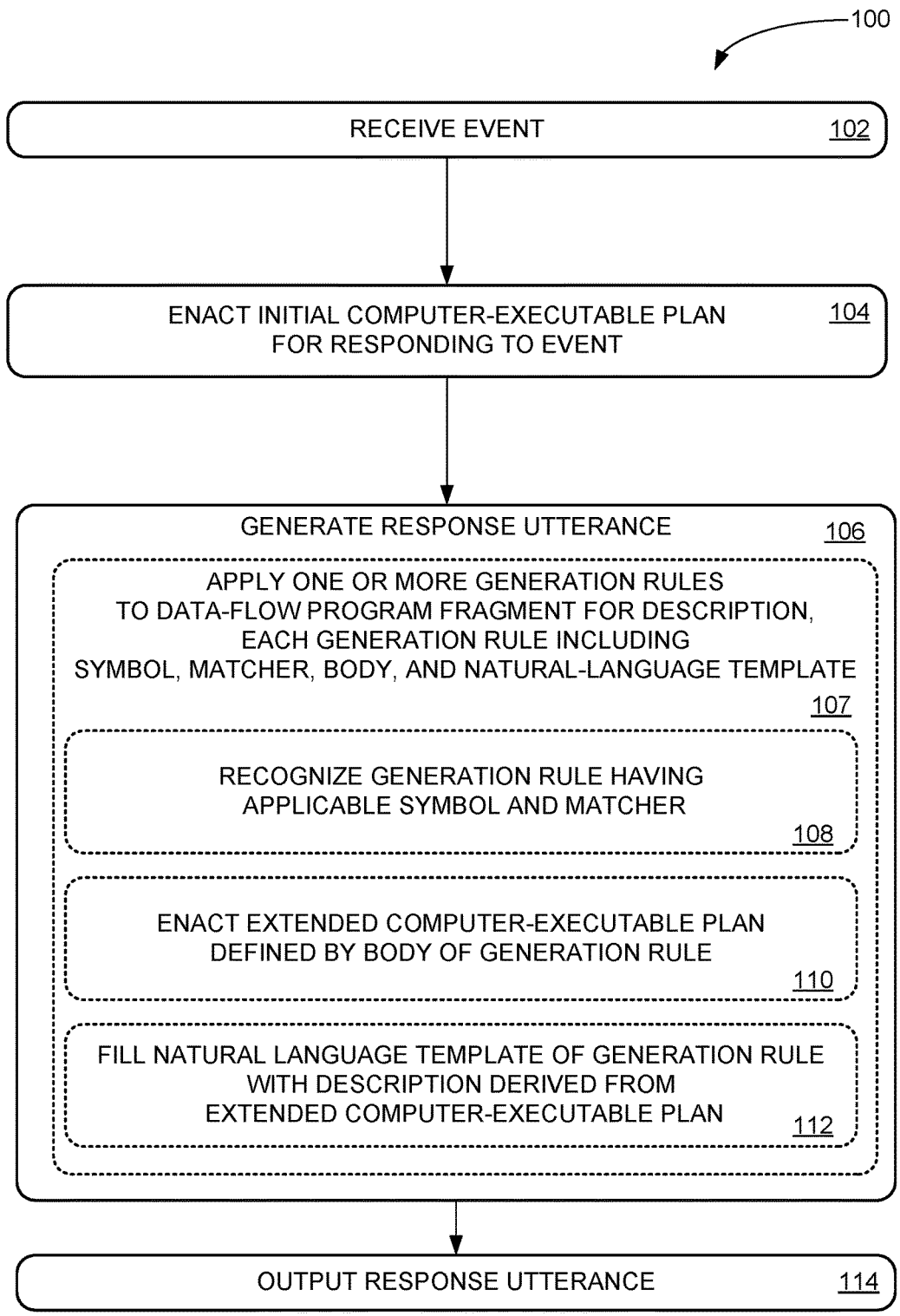

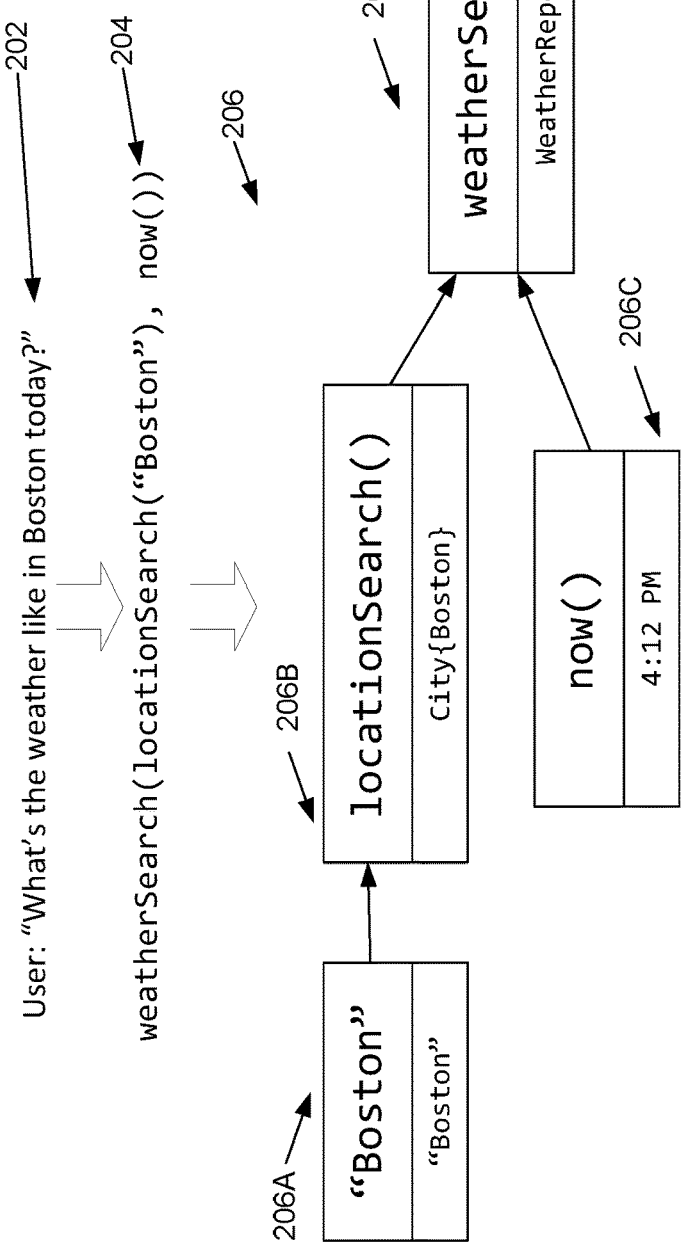
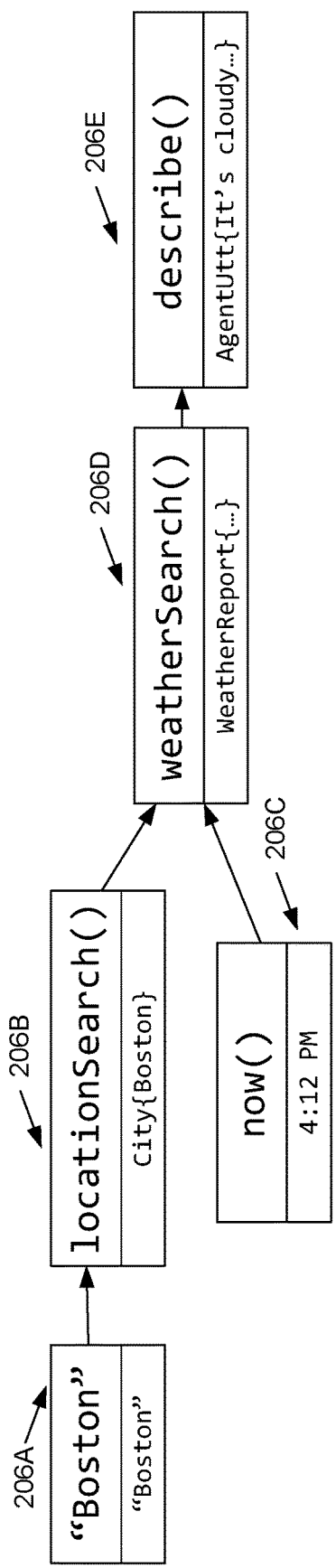
FIG. 2A
FIG. 2B

FIG. 2C

Rule 1:
Symbol: Sentence

Matcher:
[report]: WeatherReport = weatherSearch([place], [time])

Body:
[weatherNow] = [report].summary
assert(isPleasant([weatherNow]))
[timeNext] = [time] + 1.hour()
[weatherNext] = weatherSearch([place], [timeNext]).summary
assert(not(isPleasant([weatherNext])))

Template:
It is {Entity [weatherNow]} {Property [time]}, but {Entity [weatherNext]} starting {Property [timeNext]}.

Rule 2:
Symbol: Entity
Matcher: [summary]: String = [something].summary
Body: <none>
Template: [summary]

Rule 3:
Symbol: Property
Matcher: [time]: Time = now()
Body: <none>
Template: right now

Rule 4:
Symbol: Property
Matcher: [time]: Time
Body: [timeStr] = formatString([time])
Template: at [timeStr]

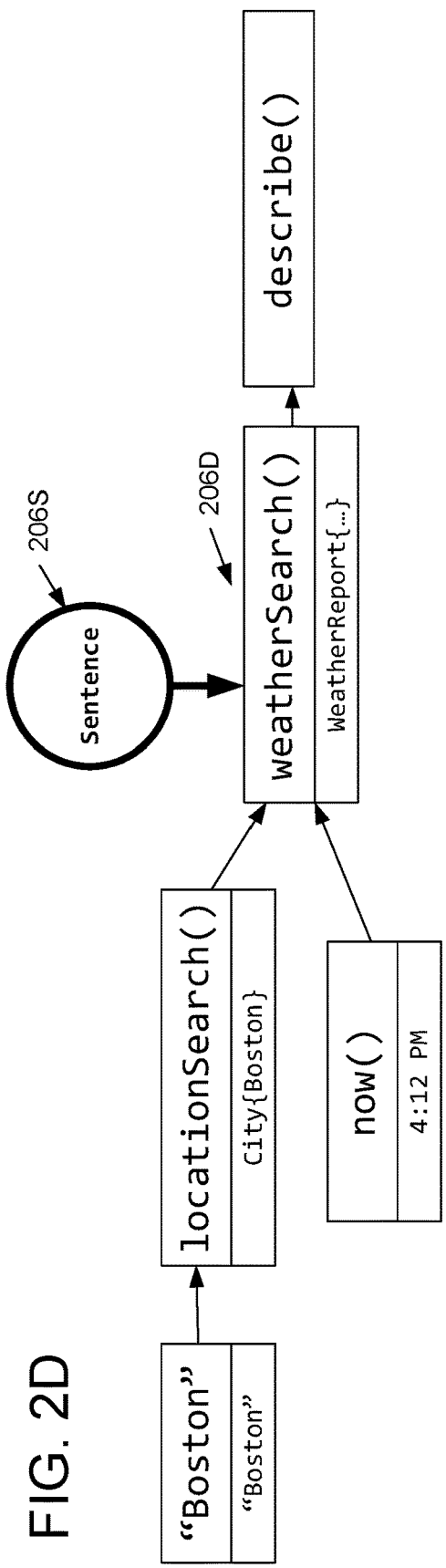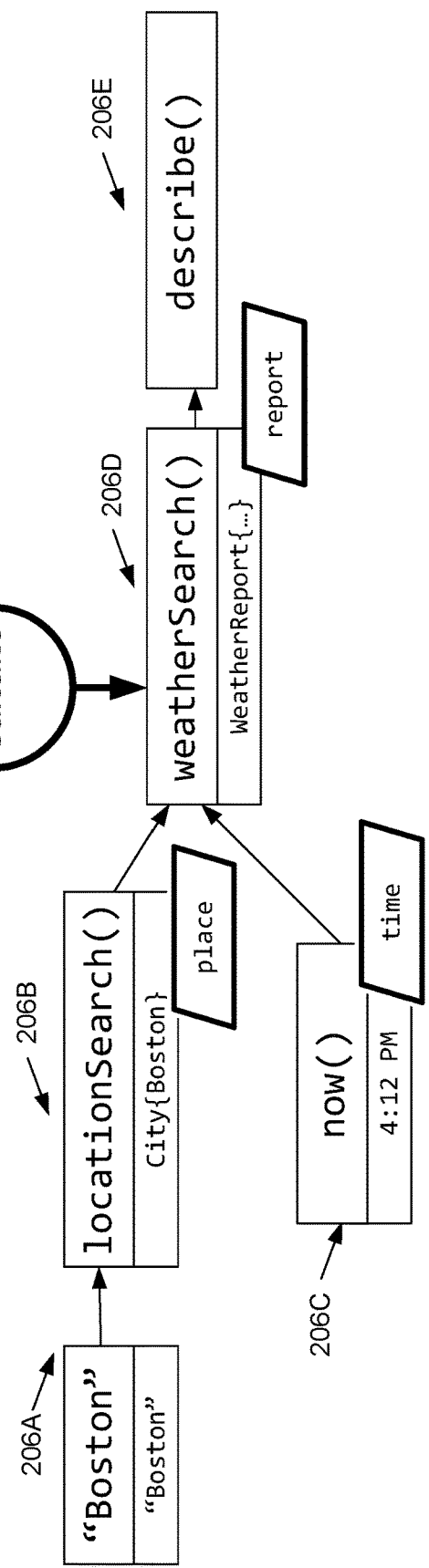
FIG. 2D
FIG. 2E

RESPONSE GENERATION FOR CONVERSATIONAL COMPUTING INTERFACE

CROSS REFERENCE TO RELATED APPLICATIONS

This application claims priority to U.S. Provisional Patent Application Ser. No. 62/885,671, filed Aug. 12, 2019, the entirety of which is hereby incorporated herein by reference for all purposes.

BACKGROUND

Conversational computing interfaces that utilize machine learning or other artificial intelligence techniques may be trained to respond to different kinds of user utterances, for example by performing computer operations and producing descriptive content based on results of the computer operations (e.g., outputting a response utterance and/or presenting graphical user interface content, such as interactive card content). As an example, a conversational computing interface may be trained to respond to a user saying, "What'll the weather be like?" by querying a network-accessible weather service for tomorrow's weather report, and outputting a response utterance based on the weather report.

BRIEF DESCRIPTION OF THE DRAWINGS

FIGS. 1B and 1C show exemplary methods for generating responses to events in a conversation between a user and a conversational computing interface.

FIGS. 2A-2I show an exemplary derivation of a response to an exemplary input utterance.

SUMMARY

Figure 1A:
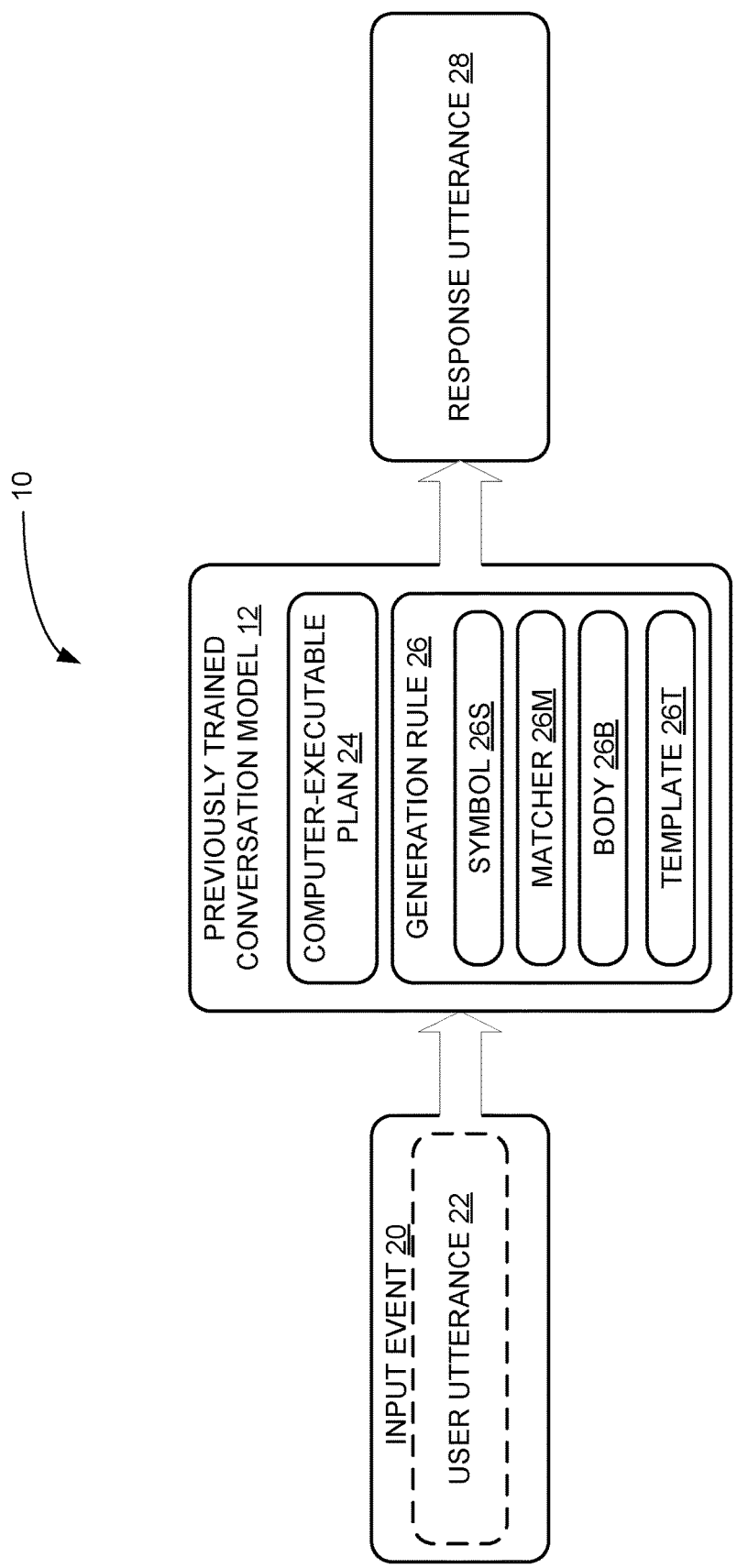
FIG. 1A shows an exemplary architecture for a conversational computing interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer-implemented method of responding to a conversational event comprises enacting, by a conversational computing interface, an initial computer-executable plan based on a conversational event received by the conversational computing interface, wherein the initial computer-executable plan is configured to output an initial value based on the conversational event. The method further comprises selecting, by the conversational computing interface, an extended computer-executable plan based on determining that the initial value is insufficient for generating an extended description responsive to the conversational event. The method further comprises enacting, by the conversational computing interface, the extended computer-executable plan to output additional information beyond what the initial computer-executable plan is configured to output, the additional information sufficient for generating the extended description responsive to the conversational event. The method further comprises outputting, via the conversational computing interface, a response to the conversational event including the extended description.

DETAILED DESCRIPTION

Conversational computing interfaces enable human users to interact with computers in a more natural manner. A properly trained conversational computing interface is able to process natural user interactions such as spoken user utterances or written user commands, without requiring the user to use a particular syntax defined by the computer. This allows the human user to use natural language when addressing the computer. For example, the user may interact using natural language by asking the computer to answer a question or by giving the computer a command. In response, the conversational computing interface is trained to automatically perform actions, such as answering questions or otherwise assisting a user (e.g., reporting today's weather forecast in response to the human saying or typing "What is the weather like?"). The conversational computing interface may respond to the user request with any suitable computer operations, for example outputting synthesized speech via a speaker, and/or interacting with other computer technologies via application programming interfaces (APIs) to find search results, make purchases, and/or schedule appointments.

Conversational computing interfaces may be configured to respond to various user interaction events. Non-limiting examples of events include user utterances in the form of speech and/or text, button presses, network communication events (e.g., receiving a result of an API call), and/or gesture inputs. More generally, events include any occurrences that may be relevant to user interaction and that are detectable by a conversational computing interface, for example via input/output hardware (e.g., microphones, cameras, keyboards, and/or touch-screens), communication hardware, and the like. Such events may be represented in a computer-readable format, such as a text string generated by a speech-to-text interpreter or screen coordinate values associated with touch inputs.

Conversational computing interfaces may be configured to perform any suitable actions to assist a user. Non-limiting examples of actions include performing computations, controlling other computers and/or hardware devices, (e.g., by invoking an API), communicating over networks (e.g., to invoke an API), receiving user input (e.g., in the form of any detectable event), and/or providing output (e.g., in the form of displayed text and/or synthesized speech). More generally, actions may include any behaviors that a computer system is configured to perform. Other non-limiting examples of actions include controlling electronic devices (e.g., turning on/off lights in a user's home, adjusting a thermostat, and/or playing multimedia content via display/speakers), interacting with commercial and/or other services (e.g., invoking an API to schedule a ride via a ride-hailing service and/or ordering food/packages via a delivery service), and/or interacting with other computer systems (e.g., to access information from a website or database, send an email, and/or access a user's schedule in a calendar program).

Accordingly, by recognizing various events and in response, performing relevant actions, conversational computing interfaces enable users to use conversation, gesture, and other modes of expression to control a computer to perform any suitable tasks. Actions for performing different tasks may be represented in any suitable format that may be interpreted by a computer to cause the computer to perform some suitable action. In some examples, conversational computing interfaces may support a finite plurality of predefined actions, which sometimes are referred to as "skills." For example, a conversational computing interface may support a predefined plurality of hard-coded skills, where each skill has a number of slots that can be filled to parametrize a hard-coded action, such as invoking an API, e.g., to reserve a seat at a restaurant, call a ride-hailing service, and/or look up the weather. However, although conversational computing interfaces may support a plurality of different predefined actions via the hard-coded skills, a conversational computing interface that only supports predefined actions via hard-coded skills may not be configured to perform more complex or novel behaviors. Furthermore, conversational computing interfaces using hard-coded skills are typically configured to produce response utterances based on hard-coded rules that are specific to a particular hard-coded skill. For example, the hard-coded skill may include computer-executable code for performing an action and producing an output response related to the action. For example, response utterances may be output in the form of audible responses, visible responses, and/or in any other suitable format. However, hard-coded skills are specific to particular situations and it may not be possible to use hard-coded skills to assist users in novel situations.

More generally, conversational computing interfaces may be configured to recognize various events, and to perform various actions in response to events by generating a computer-executable plan. "Plan" is used herein to refer to any suitable representation of steps that may be taken by a computer in order to perform an action. For example, a computer-executable plan may include computer-executable code configured to cause a computer to perform computational steps related to the action. As a non-limiting example, the computer-executable plan may include computer-executable bytecode in a data-flow programming language (e.g., in a data-flow programming language specific to conversational computing interface 10, or in any other suitable programming language). Alternately or additionally, the computer-executable plan may include any other suitable data for representing computational steps and data flow and/or control flow related to the computational steps, for example any suitable computer functions and/or operations, arranged in any suitable sequence, tree, graph, and/or hypergraph. A conversational computing interface that enacts a plan (e.g., by generating and at least partially executing the plan) may be able to automatically employ complex conversational approaches in response to an input event. For example, the plan may enable the conversational computing interface to take initiative to effectively handle the input event, ask appropriate questions of a user (e.g., to seek clarification if there is an ambiguity, and/or to seek confirmation before automatically making a decision), describe the results of enacting a plan, and/or describe the process of obtaining the results (e.g., describing steps in the plan itself).

However, although a computer-executable plan may describe computer operations for performing a particular action, the computer-executable plan may not fully specify what kind of response utterance to issue based on the plan and/or results of executing the plan. As an example, it may be desirable for the specific format and/or content of a response utterance to vary based on different possible outcomes resulting from enacting the computer-executable plan. For example, if a user asks what the weather is like, the computer-executable plan for handling the user utterance may include using a weather information API to assess the current weather. Accordingly, depending on the assessed result (e.g., sunny, rainy, snowy), it may be desirable to produce response utterances of different formats and/or contents. For example, if it is sunny, it may be desirable to tell the user that it is sunny, but also to tell the user whether it is likely to rain later, e.g., "It is sunny right now, but it may rain at 3 PM." As another example, if it is rainy or snowy, it may be desirable to tell the user how much precipitation is expected or when it is expected to let up, e.g., "It is raining right now, and it is expected to rain until tomorrow morning at 8 AM."

Accordingly, the present disclosure relates to producing descriptive content (e.g., response utterances) related to a computer-executable plan. FIG. 1A shows a conversational computing interface 10 including a previously-trained conversation model 12 configured to process an input event 20. For example, optionally the input event 20 may be a user utterance 22. Previously-trained conversation model 12 is further configured to perform actions, for example producing a response utterance 28.

Previously-trained conversation model 12 may include a previously-trained code generator (e.g., configured to generate computer-executable plans) and/or a previously-trained content generation model (e.g., configured to generate descriptive content related to computer-executable plans). The content generation model may be referred to herein as a generation module. As will be described herein, the generation model is configured (e.g., via training) to apply generation rules to traverse computer-executable plans and produce descriptive content related to the computer-executable plans. Via suitable training, a previously-trained generation model may be able to flexibly produce descriptive content related to arbitrary computer-executable plans.

Conversational computing interface 10 may be configured to respond to any suitable user interaction detected as input event(s) 20. For example, input event 20 may be detected by a computer with any suitable input devices/sensors. Previously-trained conversation model 12 is configured to enact a computer-executable plan 24 including suitable steps for performing actions responsive to the input event 20 and including suitable steps for producing response utterance 28. For example, computer-executable plan 24 may be executable to gather information and/or cause real-world events to occur by invoking an API (e.g., ordering a pizza, or scheduling a ride in a ride-hailing service). The conversational computing interface 10 may be trained to generate novel and/or complex computer-executable plans. For example, the conversational computing interface may be configured to generate computer-executable plans for events that did not occur in the training data, so as to generalize the training from the exemplary annotated dialogues provided in training data to other, similar and/or dissimilar situations.

Previously-trained conversation model 12 is further configured to apply one or more generation rule(s) 26 to the computer-executable plan 24 and/or results of executing the computer-executable plan 24 in order to produce response utterance 28, wherein the specific format and/or content of response utterance 28 may vary based on different possible outcomes resulting from enacting the computer-executable plan 24. As will be described below, a generation rule 26 includes a symbol 26S and a matcher 26M indicating when the generation rule 26 may be applied, a body 26B including an extended computer-executable plan that may be executed to perform additional computations related to producing the response utterance 28, and a template 26T indicating how to produce output (e.g., natural language utterances or any other suitable descriptive content) based on results of executing computer-executable plan 24 and/or computer-executable plans of body 26B.

Computer-executable plan 24 may be generated by previously-trained conversation model 12 in any suitable fashion. For example, previously-trained conversation model 12 may include a previously-trained code generator configured to generate computer-executable plans. The previously-trained code generator may include any suitable combination of state-of-the-art and/or future statistical, machine learning (ML), artificial intelligence (AI), and/or natural language processing (NLP) technologies. The previously-trained code generator may be trained in any suitable fashion to generate suitable computer-executable plans based on input events, for example, by supervised training based on data indicating exemplary input events and suitable actions and/or response utterances for responding to the exemplary input events.

In some examples, computer-executable plans may include programming language elements specific to training and/or operating the conversational computing interface, for example, operations for receiving input utterances, and/or operations for searching a dialogue history of previous interactions with a particular user to find information related to the previous interactions.

As an example, a computer-executable plan may include a "describe" operation parametrized by one or more portions of a computer-executable plan. For example, the "describe" operation may be parametrized by indicating one or more data-flow program fragments corresponding to steps of the computer-executable plan. Accordingly, the "describe" operation may be utilized to describe the data-flow program fragment and/or to describe results of executing the data-flow program fragment, for example to produce a suitable response utterance to output to a user, to generate descriptions for use in training data for a conversational system, and/or for any other purpose.

The present disclosure includes techniques for language generation in conversational computing interfaces. The generation model may be trained to produce response utterances in a variety of different situations, for example by training on a set of generation rules (e.g., response generation rules provided by human annotators). Techniques for obtaining generation rule training data are described further below. The generation model is configured to apply generation rules to a computer-executable plan enacted by the conversational computing interface. For example, the generation rules may be applied by traversing a data-flow graph representing the computer-executable plan. Accordingly, the generation rules may produce a description based on the data-flow graph contents, e.g., representing all of the computations a conversational agent has performed over the course of a conversation. Generation rules may be configured to produce the response utterance in any suitable fashion, for example a generation rule may be applied to add text to a response utterance that will be output in the conversation, extend the computer-executable plan with additional computations by adding new nodes to the data-flow graph, and/or recursively traverse the data-flow graph to apply more generation rules. A plurality of generation rules may be applied to obtain a set of candidate response utterances, which may be utilized in any suitable fashion (e.g., ranked to select a specific response utterance, and/or used in training data).

The generation model may be trained to learn which candidate response utterances are the most suitable based on any suitable data, for example data provided by human users. For example, data may be obtained from human engineers who may have extensive knowledge of the generation model, and/or from less-skilled human demonstrators who may perform one or demonstration tasks related to the generation model, for example ranking candidate actions and/or responses, and/or providing exemplary actions and/or responses. As an example, human demonstrators may be shown exemplary computer-executable plans that include one or more "describe" operations for producing response utterance content, and asked to provide suitable natural language descriptions for each describe operation, for example by directly authoring suitable natural language descriptions and/or by selecting suitable candidate response utterances from a set of candidate response utterances produced by the generation model. The generation model may be trained to produce suitable response utterances automatically. For example, the generation model may include any suitable statistical, ML, AL, and/or NLP models, which may be trained in any suitable fashion. For example, the generation model may be trained based on a training data set including plurality of different exemplary annotated dialogues, where an annotated dialogue may indicate events, suitable computer-executable plans, and/or suitable response utterances. Training based on annotated dialogues will be described further below.

Although the techniques of the present disclosure are described with regard to generating output utterances for a conversational computing interface, the techniques described herein are not so limited. The techniques described herein may be used for generating content (e.g., natural language content or any other suitable descriptive content) for any suitable purpose, for example, to generate suggested input utterances for a user (e.g., in an auto-complete interface), to dynamically construct graphical user interfaces (GUIs), and/or to produce cues for a text-to-speech system, as will be further described below.

Accordingly, FIG. 1B shows an example method 100 for producing a response utterance in response to an event, by applying generation rules to a computer executable plan.

At 102, method 100 includes receiving an event. For example, the event may be an input utterance. For example, FIG. 2A shows an exemplary event in the form of an input utterance 202 in which a user asks, "What's the weather like in Boston today?".

At 104, method 100 further includes enacting an initial computer-executable plan for responding to the event. As used herein, "enacting" a computer-executable plan may include generating and at least partially executing the computer-executable plan. In some examples, enacting a computer-executable plan may include generating and executing portions of the computer-executable plan until an error condition is reached. In some examples, enacting a computer-executable plan may include generating multiple alternative candidate computer-executable plans and successfully executing at least one of the alternative candidate computer-executable plans (e.g., when some of the other alternative candidate computer-executable plans may result in an error condition upon execution).

As a non-limiting example, returning briefly to FIG. 2B, a conversational computing interface may be trained to respond to the utterance 202 by enacting a suitable computer-executable plan, such as data-flow program 204. Exemplary techniques for obtaining training data for training (e.g., supervised training) are described below.

Irrespective of specific computer representations (e.g., specific programming language(s)) of a computer-executable plan, computer-executable plans generally correspond to data-flow graphs indicating results computed while executing the computer-executable plan, provenance of the results, and/or dependencies among different steps in the computer-executable plan. Accordingly, for any computer-executable plan in any suitable format, a corresponding data-flow graph may be used to track the execution of the plan. For example, whenever an operation in the data-flow program is executed to produce a result, a corresponding node in the data-flow graph may be updated to indicate the result.

As shown in FIG. 2A, the execution of the data-flow program 204 may be tracked in a data-flow graph 206. The structure of the data-flow graph 206 corresponds to syntactic structure of the data-flow program 204, e.g., a node corresponding to a function is downstream from nodes corresponding to parameters, which have directed edges (e.g., indicated by arrows) pointing to the node corresponding to the function. The depiction of the data-flow graph 206 is non-limiting, and data-flow graphs may be represented and/or visualized in any suitable fashion. As a further non-limiting example, data-flow graphs may be stored in an optimized computer data structure, e.g., a graph structure with nodes represented as records in computer memory and with edges represented as computer memory addresses (e.g., pointers). In the present disclosure, data-flow programs and/or data-flow graphs are nonlimiting examples of computer executable plans. For example, in some examples presented herein, a particular computer-executable plan may be illustrated and/or described variously in the form of data-flow program fragments and/or data-flow graph nodes, e.g., for illustrative purposes. Similarly, nodes in data-flow graphs, data-flow program fragments, data-flow programming operations and/or functions, and/or steps in computer-executable plans may be referred to interchangeably.

As shown in FIG. 2A, the tracked execution is depicted with nodes representing data-flow program operations, and each node includes a top portion and a bottom portion. The top portion of each node indicates a value for evaluation (e.g., a function name such as "locationSearch( )" in node 206B, or a literal value such as "Boston" in node 206A), related to a step for performing an action. The bottom portion of each node indicates an evaluation result, e.g., results of executing that step. For example, node 206A indicates that the literal value "Boston" evaluates to a string having the same value, "Boston." Node 206B indicates that the "locationSearch( )" function parametrized with the string "Boston" supplied by node 206A evaluates to data denoted as City{Boston}, e.g., a computer-readable description of Boston such as a data-structure including features of Boston and/or an identifier associated with Boston. FIG. 2B shows similar tracking of the execution of the similar data program with the "describe" operation added.

As the values involved in a data-flow program (e.g., as shown in FIG. 2A or FIG. 2B) are evaluated, the results of evaluation may be indicated in corresponding nodes in the data-flow graph. For example, the literal value "Boston" in node 206A may not require further evaluation, and accordingly the same literal value is indicated as that returned in the leftmost node. The "locationSearch" function in node 206B, which is parametrized by the "Boston" value in node 206A, may be configured to return a computer-readable representation of a specific city, which is indicated in FIG. 2A as a non-limiting example value "City{Boston}." For example, "City{Boston}" may refer to any other suitable computer data, for example including an identifying string, coordinate data, or any other suitable representation. The "now" function in node 206C is configured to return a current clock time, e.g., "4:12 PM." The "weatherSearch" function in node 206D is configured to return a "WeatherReport{ . . . }" value pertaining to current weather, for example by querying a weather service API to receive any suitable data indicating the current weather (e.g., text descriptions, temperature, and/or precipitation volume). Finally, the "describe" function in node 206E of FIG. 2B is configured to return an agent response utterance indicating the current weather, e.g., a string indicating that "it's cloudy," or any other suitable description (e.g., based on the results in the WeatherReport{ . . . } returned by node 206D).

Returning to FIG. 1B, at 106, method 100 further includes generating a response utterance. In at least some examples, as shown at 107, the response utterance is generated by applying one or more generation rules to a data-flow program fragment in a computer-executable plan. Using the example of FIG. 2B, the data-flow program fragment may include a "describe" operation (e.g., the "weatherSearch" node 206D that is the parameter of the "describe" operation in FIG. 2B). Accordingly, the response utterance may indicate any suitable features of the data-flow program fragment (e.g., indicating that the data-flow program fragment pertains to the weather) and/or results thereof (e.g., indicating a specific weather condition returned by an API).

In some examples, a conversational computing interface may be configured to automatically infer a final "describe" operation for a computer-executable plan that does not otherwise include a "describe" operation, e.g., in order to automatically describe an overall result of the computer-executable plan and provide a suitable response utterance. For example, the automatic "describe" operation may be added to the computer-executable plan and parametrized by a data-flow program fragment corresponding to a terminal (e.g., most downstream) vertex in a corresponding data-flow graph (e.g., a highest-ordered vertex according to an order induced by topologically sorting the data-flow graph). For example, FIG. 2B shows a data-flow graph corresponding to an extended data-flow program that may be automatically inferred based on the data-flow program 204 shown in FIG. 2A, namely by adding a "describe" operation parametrized by the "weatherSearch" operation.

Whether the "describe" operation is explicitly generated as part of the computer-executable plan 24 and/or automatically inferred for computer-executable plan 24, the "describe" operation is configured to produce response utterance 28, by applying one or more generation rule(s) 26 to the computer-executable plan 24.

Generating the response utterance optionally may include matching one or more generation rules with the computer-executable plan (e.g., with data-flow program fragments, and/or values tracked in a data-flow graph corresponding to execution of the data-flow program fragments). In some examples, the generation rules may be defined by human users (e.g., human demonstrators and/or human engineers). The generation rules may be configured to extend the computer-executable plan with any suitable computer operations, in order to produce suitable response utterances. For example, a generation rule may be configured to add text to the response utterance that will eventually be returned. Alternately or additionally, a generation rule may be configured to extend the data-flow graph with additional nodes representing unexecuted steps in an extended computer-executable plan. The extended computer-executable plan, including the unexecuted steps associated with the additional nodes, may be executed before returning a complete response utterance and/or before attempting to match further rules. Furthermore, generation rules may be applied to recursively traverse the data-flow graph and to attempt to apply more generation rules, for example, to produce an overall description of an action by recursively describing portions of the data-flow graph.

A generation rule may include a symbol, a matcher, a body, and a natural-language template. The symbol of a generation rule indicates a type of descriptive output that a rule may be applied to generate. For example, a symbol may indicate a part of speech such as a sentence, entity (e.g., a noun phrase), or property (e.g., an adjective phrase). Alternately or additionally, a symbol may indicate any other suitable category of utterance (e.g., exclamation, name, number, counting word, or any other suitable designation). The matcher of a rule indicates specific computer-executable plans that the rule may be applied to, for example by designating a function name, result value, and/or syntactic structure associated with the computer-executable plans.

In general, the previously-trained generation model may be configured to: 1) generate a description by selecting one or more potentially applicable rules based on symbol types associated with the rules and/or matchers associated with the rules; 2) attempt to apply the potentially applicable rules by executing an extended computer-executable plan based on the body of such rules; and 3) for any rules for which the body could be successfully executed, generate a description with the natural-language template. The previously-trained generation model is configured to select one or more of the generated descriptions, for example to output the response utterance.

Generation rules may be applied to any suitable computer-executable plan(s), including data-flow programs, data-flow program fragments, and/or data-flow graphs tracking the execution of computer-executable plans. For example, although the present disclosure describes applying generation rules to nodes in a data-flow graph based on an exemplary data-flow programming language, generation rules according to the present disclosure may be similarly applied to data-flow programs/data-flow program fragments in any suitable representation.

The symbol and matcher of a generation rule are computer-readable descriptions for selecting applicable data-flow program fragments to which the generation rule can be applied. Accordingly, at 108, method 100 optionally includes recognizing a generation rule having a symbol and matcher that are applicable to the data-flow program fragment being described. The generation rule may be applied to generate a description of the computer executable plan and/or results thereof. In some examples, applying the generation rule may include recursively applying one or more further generation rules.

In some examples, a generation rule may include one or more parameters. For example, a generation rule configured to output a description of a date may include a parameter indicating whether to use a long format for the date (e.g., including the time and/or including full month names) or a short format for the date (e.g., omitting the time and/or using numbers instead of month names). Alternately or additionally, the generation rule for the description of the date may include a parameter indicating whether to use a European convention for date format (e.g., days-months-years) or a United States convention for the date format (e.g., months-days-years). Furthermore, the examples of parameters with regard to descriptions of dates are non-limiting. Suitable parameters may be defined for any kind of descriptive output. As non-limiting examples, parameters may be defined for sentences, entities, properties, specific kinds of entities and/or properties such as dates, names, places, weather, colors, numbers, descriptions of actions, and/or descriptions of API results. When a generation rule is configured with a parameter, the parameter may be recursively passed to any other generation rules that are recursively applied while determining the output. For example, if the generation rule is configured with a parameter for "short format" date content, then any sub-rules that are recursively invoked may be configured with the same "short format" parameter. Alternately or additionally, when recursively invoking generation rules, parameters may be modified for recursively passing modified parameters to the recursively-invoked rules. For example, if a top-level generation rule is configured with a parameter for "long format" date content, the generation rule may be nevertheless configured for passing a "short format" date content parameter to any recursively-invoked sub-rules, e.g., so that a date is described in a long format just once and described in a short format during subsequent references to the date. The examples presented herein are non-limiting, and parameters may be modified and/or passed unmodified during recursive application of generation rules, in any suitable fashion. Furthermore, parameters may be configured to influence generation rule output in any suitable manner, for example by defining additional data values that are available when executing the body or matcher of a generation rule and/or any recursively invoked generation rule.

Returning briefly to FIG. 2B, the "describe" operation is parametrized with the "weatherSearch" operation in node 206D. Accordingly, FIG. 2C shows four exemplary generation rules that may be applied to produce the description specified by the computer-executable plan in FIG. 2B.

As shown in FIG. C, exemplary rule 1 is configured for generating sentences, exemplary rule 2 is configured for generating entities, and exemplary rules 3 and 4 are configured for generating properties. Suitable symbol(s) for a given "describe" operation may be selected in any suitable manner, for example, a top-level "describe" operation may be configured to apply rules with the "sentence" symbol. In some examples, a natural-language template may indicate one or more values to be described and used to fill in the template, along with symbols for the values. For example, as will be described below, a template may indicate that a certain value should be described as a property and/or as an entity. Symbols may be defined in any suitable fashion, for example, non-terminal symbols from a natural language grammar such as "noun phrase," "adjective phrase," "independent clause," and/or "dependent clause." In general, when generating a particular description (e.g., a top-level description or a description for filling in a template), only generation rules of a particular matching symbol need to be considered (e.g., for generating a top-level description, only "sentence" rules need to be considered).

A rule further includes a matcher configured to accept or reject a node in the data-flow graph, for example by testing the function at that node, the value the function returned, or recursively testing the arguments the function consumed (e.g., testing the function at an argument node, the value returned by the argument node, and/or further recursively testing further arguments of the argument node). A matcher is configured to determine whether a rule applies to a given piece of the dataflow graph. For example, as shown in FIG. 2C, the matcher of Rule 1 is configured to match a node that fulfills two conditions, namely that the node (1) contains a WeatherReport that (2) resulted from a call to the weatherSearch function. The matcher is configured to assign the name [report] to the report value itself, and the names [place] and [time] to the two arguments of the call to weatherSearch. If the matcher is not applicable in the generation model's current state (e.g. if the vertex was not produced by a call to weatherSearch), then the rule is not used (i.e., other rules may be used instead). However, as shown in FIG. 2C, the matcher is applicable since the data-flow graph in FIG. 2B shows a corresponding WeatherReport that resulted from a call to the weatherSearch function.

In some examples, as shown in FIG. 2C, matchers may be represented by unexecuted data-flow program fragments. For example, matchers may be represented by data-flow program fragments in a data-flow programming language associated with a conversational computing interface. In some examples, the data-flow programming language may be extended with special syntax for representing matchers (e.g., syntax for assigning a name to a data-flow program fragment).

In some examples, a matcher may not include any names indicating specific functions/results (e.g., syntax of the form [name] as depicted in FIG. 2C). For example, a matcher may match the syntactic form and/or evaluated values for a data-flow programming fragment. As an example, matchers may be configured to match data-flow graphs corresponding to arithmetic expressions or other low-level computing operations. In a non-limiting exemplary data-flow programming language syntax, an arithmetic prefix expression such as "+(1, 2)" may be configured to match any data-flow graph corresponding to the same arithmetic expression, e.g., any data-flow graph configured to calculate "1+2."

When a matcher is defined by a data-flow program fragment that does include names (e.g., syntax of the form [name]), the names may be used as wildcards for matching different data-flow graph nodes. For example, the matcher "+([x], 2)" is configured to match any data-flow graph including an arithmetic expression for adding 2 to a wildcard value (e.g., "[x]"). Accordingly, the matcher is further configured to return a mapping indicating a vertex in the data-flow graph corresponding to the wild-card value. Matchers may be arbitrarily deeply nested and support an arbitrary number of names. For example, a matcher for a nested arithmetic expression may be defined with any suitable variable names representing wildcards, for example, by the data-flow program fragment "+(1, +([x], 3)), +(1, +(2, +([x], [y])))".

In an example, syntax extensions for the data-flow programming language are configured for indicating a type to each named wildcard using the syntax "[name]: TypeName." If a type is specified (e.g., by indicating a corresponding type name), the matcher will only accept dataflow vertices whose value has that type. For example, the matcher+([x]: Number, 2) would match a data-flow graph corresponding to the arithmetic computation "1+2," but+([x]: String, 2) would not match the data-flow graph corresponding to that arithmetic computation (e.g., because 1 is a number, not a string). Alternately or additionally, matcher syntax may be configured for indicating a type and/or wildcard identifier for any intermediate expression (i.e., not just leaf expressions in the data-flow graph), using the syntax [name]: TypeName=<expression>. For example, the matcher [x]: Number=+(1, 2) would match a data-flow graph for the computation "1+2," and map the "[x]" wildcard to the result of the addition computation. Any other suitable syntactic extensions may be used for the matcher language, for example, wildcard function names, composite matchers built with AND/OR primitive operations (e.g., a composite <matcher1> AND <matcher2> is configured to match a data-flow graph node if both component matchers, namely matcher1 and matcher2 match the data-flow graph node; similarly a composite <matcher1> OR <matcher2> is configured to match a data-flow graph node if either component matcher matches the data-flow graph node, namely if either matcher1 matches or matcher2 matches). In some examples, matchers may be configured to match based on structure in a data-flow graph, e.g., to match any ancestor of a data-flow graph node and/or match any descendent of a data-flow graph node, without specifying exactly which ancestor/descendent.

As shown in FIG. 2C, rule 1 includes the matcher for a WeatherReport generated from a weatherSearch. In addition to the examples shown in FIG. 2C, the approaches described herein may be used with any other suitable matcher specifications. For example, instead of specifically matching a WeatherReport associated with a weatherSearch as in rule 1 in FIG. 2C, a matcher may be configured to match any weather report. Further examples of matchers are shown in rule 2, rule 3, and rule 4. For example, rule 2 is configured to match any summary string associated with summary property of a wildcard "[something]." Rule 3 is configured to match a time value associated with the "now" function. Rule 4 is configured to match any time value.

The body of a generation rule indicates additional computer operations that may be carried out to output a suitable description. Accordingly, at 110 of FIG. 1B, method 100 optionally includes enacting an extended computer-executable plan defined by a body of a generation rule.

For example, even after executing a computer-executable plan based on a user utterance, there may be further calculations required to assemble the results of the computer-executable plan into a user utterance (e.g., to compute additional related information). Accordingly, the body of a generation rule may be used to extend the initial computer-executable plan into an extended computer-executable plan. For example, the body of the generation rule may include additional data-flow program fragments. Accordingly, applying the generation rule may include attempting to execute the additional data-flow program fragments, in order to determine whether the body may be successfully applied. In some examples, the extended computer-executable plan may be represented as an extended data-flow graph including the original data-flow graph, e.g., by adding nodes to the original data-flow graph indicating new values to be computed according to the additional data-flow program fragments. When executing the extended computer-executable plan, the conversational computing interface may be configured to only evaluate the new nodes, e.g., to avoid redundantly re-evaluating nodes from the initial computer-executable plan. Accordingly, the extended computer-executable plan may be configured to compute additional information and/or perform additional actions related to the initial computer-executable plan. The body of a rule may refer to values from the data-flow graph and/or values mapped by a matcher of the same rule, e.g., the body of rule 1 refers to the "report," "place," and "time" values mapped by the matcher of rule 1. The body of a rule may also include intermediately-derived values and/or constants related to generating a response, e.g., as with intermediate values "weatherNow," "timeNext," and "weatherNext," defined in the body of rule 1.

In some examples, a body data-flow program fragment may include one or more assertions configured to indicate an explicit failure of applying the body, unless certain conditions are met. Accordingly, the rule may be tried for different situations but may only be used for the final generated response utterance in situations where the conditions are met. For example, rule 1 has a body configured to assess whether the current weather is pleasant, and if the weather is pleasant, to check the weather for one hour later. The body of rule 1 includes assertions indicating that the current weather is pleasant (e.g., "assert(isPleasant([weatherNow]))" and indicating that the weather later will not be pleasant (e.g., "assert(not(isPleasant([weatherNext])))"). Accordingly, rule 1 may only be applied and used for final generated response utterances in situations where the current weather is pleasant, but the weather may not be pleasant later. As will be described below, rule 1 is also associated with a template for describing how the weather is currently pleasant but will be changing starting at a subsequent time. Accordingly, rule 1 may be used to generate corresponding output describing the current weather and the weather later, but rule 1 will only be used when the situations established by the matcher and the assertions in the body are met, e.g., when the weather is pleasant but may change for the worse.

In other examples, the body of a rule may not include any assertions and may be unconditionally applied for generating descriptions, as long as the symbol and/or the matcher for the rule are applicable. For example, rule 4 includes a body for calculating a formatted time string. In other examples, a rule may include an empty body (e.g., indicating a "no-op" where no additional calculations need to be carried out). For example, rules 2 and 3 have empty bodies. Although a rule may have an empty body, the rule may still cause a new mapping of wildcard names, for example, rule 2 maps the name [summary] and rule 3 maps the name [time].

By performing new computational steps in the course of outputting a description, the conversational computing interface may be able to take "initiative" to fulfill user requests (e.g., to satisfy an implicit desire implied by a user request). For example, rule 1 is configured to describe the weather, not only by outputting a description of the current weather, but by further outputting a description of the weather in an hour if the weather is expected to change. In the example, the body extracts a summary of the weather report the user asked about and asserts that the weather is currently pleasant. The body then searches for an additional weather report an hour later than the one requested by the user, asserts that the weather an hour later is unpleasant, and extracts the corresponding summary. As described above, the assertion that the weather one hour later is unpleasant ensures that the body can only be fully executed if the weather is pleasant at the time specified by the user but unpleasant an hour later. Accordingly, the rule may be applied to assess whether the weather is likely to change and, if the weather is likely to change, the rule body is successfully executed so that a suitable response utterance may be generated using the natural language template of the rule. Generating response utterances using rules such as rule 1 may assist the user by providing information that the user is likely interested in but may not have explicitly asked for. For example, a user may be interested in the weather so that they may select appropriate attire, and as such if the weather is expected to change the user may wish to know about the change. Accordingly, applying rule 1 may result in gathering additional information and including the new information in the response utterance, e.g., so that the user receives pertinent information without needing to ask follow-up questions.

Rule bodies may be applied for all rules having an applicable matcher and symbol. If execution of a rule fails (e.g., due to an assertion or due to an error condition), the rule may be immediately aborted and the results of applying the rule may be ignored. In other words, rule bodies may be attempted based on a rule having an applicable matcher and symbol, even if the rule body cannot be successfully executed. Although FIG. 2C shows only four exemplary rules, any number of rules may be used. Accordingly, there may be many different candidate rules having applicable symbol/matcher, and each candidate rule body may be executed to attempt to generate response utterances in different ways.

After successfully executing an extended computer-executable plan defined by a generation rule body, the conversational computing interface may have performed additional computational operations, and/or may have computed additional values pertaining to a description of the original data-flow program fragment indicated with a "describe" operation. Alternately, the generation rule body may be empty (e.g., as with rule 2 and 3). In any case, the generation rule further includes a natural-language template that may be suitable for describing the indicated data-flow program fragment when the matcher and/or symbol are applicable and the body is successfully applied.

Accordingly, returning to FIG. 1B, at 112, method 100 optionally includes filling the natural-language template of the generation rule with description(s) derived from the extended computer-executable plan. For example, further description(s) may be generated by recursively traversing the extended computer-executable plan to find suitable data-flow program fragments for computing values related to the further description(s), and applying further generation rules to the data-flow program fragments. For example, the natural-language template may indicate one or more values to be mentioned in the description. As an example, returning to FIG. 2C, rule 1 includes a template specifying an output description of the form "It is {Entity [weatherNow]} {Property [time]}, but {Entity [weatherNext]} starting {Property [timeNext]}." Accordingly, generating a description according to rule 1 includes filling in the template with descriptions for "weatherNow," "time," "weatherNext," and "timeNext." In the notation used herein, curly braces designate values that should be described by recursively calling the generation model, e.g., by recursively matching additional generation rules to the values.

After filling in a natural-language template of a generation rule with description(s) derived from the extended computer-executable plan, at 114, method 100 further includes outputting a response utterance based on the filled-in natural-language template. In some examples, more than one generation rule may be applied. Consequently, more than one natural-language template may be filled in. Accordingly, outputting the response utterance may include selecting one of the filled-in natural-language templates and outputting a text string based on that template. Selection of a particular response utterance based on multiple different generation rules may include filtering and/or ranking response utterances in any fashion. For example, the generation model may be trained based on training data indicating exemplary user utterances and suitable response utterances. Further examples of obtaining training data indicating how to select response utterances will be described below. In some examples, ranking response utterances may be based on scoring and/or ranking the different applicable rules in each state during recursive generation, thereby inducing a ranking on responses (e.g., a ranking based on a sum, product, and/or average of scores for applicable rules at each state, a mean ranking across all states, and/or any other suitable ranking based on aggregating rankings of different applicable rules in each state during recursive generation).

To support recursive generation of all pertinent descriptions associated with a data-flow graph, the generation model may be instantiated with a state indicating the current progress in generating descriptions. For example, the state may indicate a node in a data-flow graph designated for description, and a type of symbol to generate. For example, in FIG. 2D the generation rules initially are applied to the "weatherSearch" node 206D with a state indicator 206S in the form of a "sentence" symbol. As another example, the template content "{Entity [weatherNow]}" from rule 1 of FIG. 2C indicates that after applying this rule, the generation model should resume at the dataflow vertex named "[weatherNow]" using the "entity" symbol instead of the "sentence" symbol.

From a given state, the generation model is configured to identify a rule applicable in that state (e.g., a rule with an applicable matcher and symbol and with a body that is successfully executed), generate text specified by that rule, and then transition into a new state in a manner specified by the rule so as to recursively generate additional text starting from the new state. Repeating this process using all applicable rules results in a set of candidate response utterances. A single response utterance may be selected from among the candidate response utterances. For example, the candidate response utterances may be ranked using a trained statistical model, for example to match exemplary conversations in training data.

Accordingly, outputting a description for the data-flow graph includes finding an applicable rule with a suitable symbol type (e.g., a rule with a sentence symbol for outputting a top-level response utterance, and/or a rule with an entity type for describing an object). For example, for the data-flow graph shown in FIG. 2D, the description may be output by applying a rule with a sentence symbol type that matches the "weatherSearch" node 206D, such as rule 1 shown in FIG. 2C. The other rules shown in FIG. 2C do not apply, as they have different symbol types and additionally, inapplicable matchers (e.g., the value at the data-flow graph node is of the wrong type compared to the matchers for rule 2, rule 3, or rule 4).

As shown in FIG. 2E, prior to executing the body of rule 1, the names from the matcher of rule 1 of FIG. 2C are mapped to corresponding nodes of the data-flow graph, e.g. by identifying corresponding nodes that include function names, result data types, and/or result values associated with the matcher and with the data-flow graph. For example, "report" is mapped to the "weatherSearch" node 206D, "place" is mapped to "locationSearch" node 206B, and "time" is mapped to "now" node 206C.

Figure 2F:
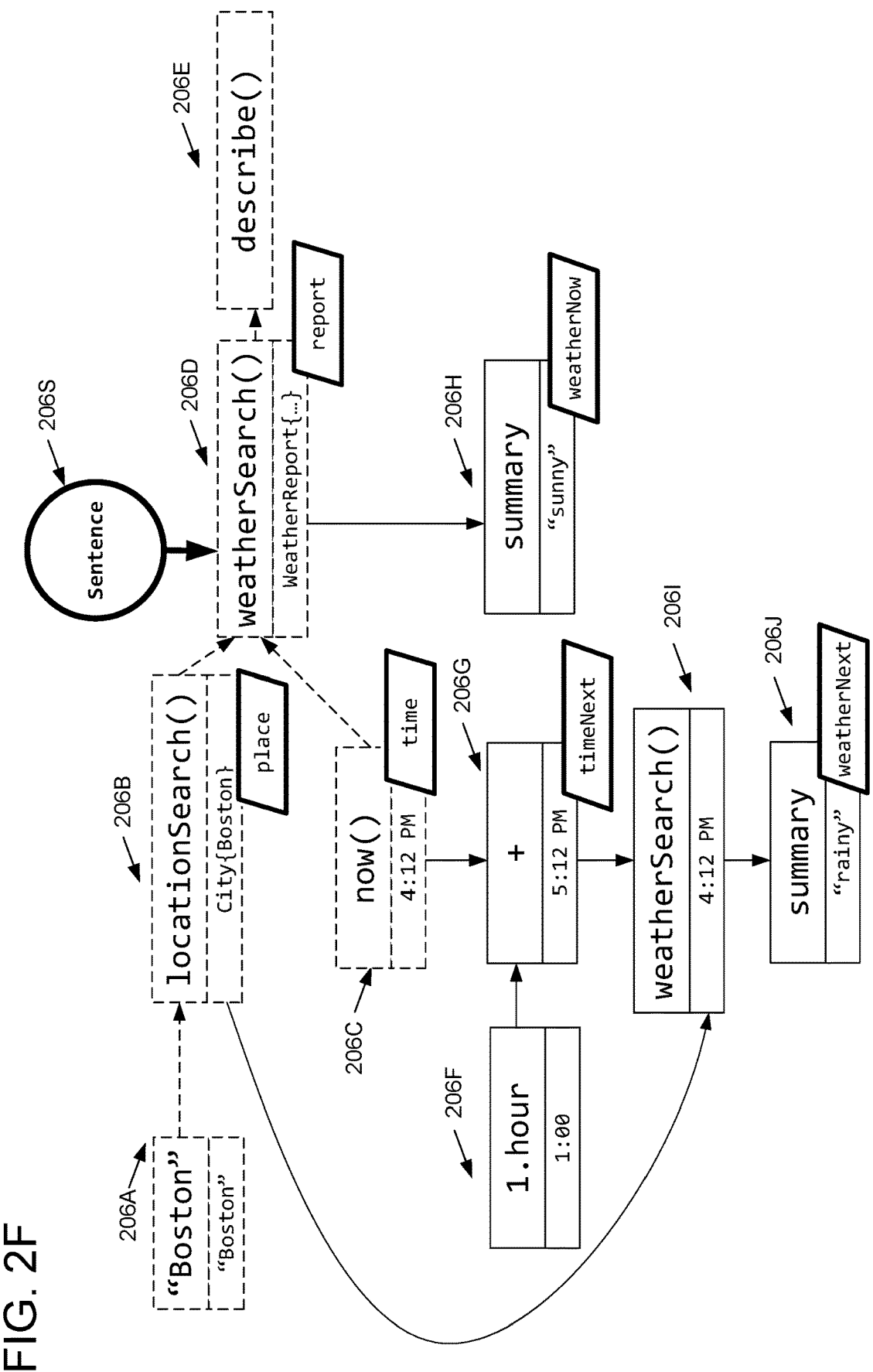

FIG. 2F shows a data-flow graph for an extended computer-executable plan obtained by extending the initial computer-executable plan with the body of rule 1 from FIG. 2C. The nodes of the initial computer-executable plan (e.g., node 206A, node 206B, node 206C, node 206D, and node 206E) are shown with dashed outlines. For simplicity, assertions from the body of rule 1 are not explicitly shown in the data-flow graph. Assuming none of the assertions in the body of rule 1 fail (e.g., assuming the weather is pleasant and the weather in 1 hour will not be pleasant), additional operations may be executed to obtain the results indicated in FIG. 2F (e.g., results indicating that the weather will be rainy later, and that "timeNext" is 5:12 PM). For example, node 206F shows a new instantiated time value based on the constant value of 1 hour; node 206G shows the "timeNext" result of adding 1 hour (from node 206F) to the present time of 4:12 PM (from node 206C); node 206H shows the "weatherNow" value, namely a summary string "sunny" derived from the weather report; node 206I shows the result of another weather report for 5:12 PM (e.g., based on the location from node 206B and the new time from node 206G); and node 206J shows the summary "rainy" resulting from the weather report for 5:12 PM.

The natural-language template from rule 1 of FIG. 2C may be populated based on the results of executing the extended computer-executable plan as shown in FIG. 2F, namely to fill in the template with descriptions according to the format: "It is {Entity [weatherNow]} {Property [time]}, but {Entity [weatherNext]} starting {Property [timeNext]}."

Figure 2G:
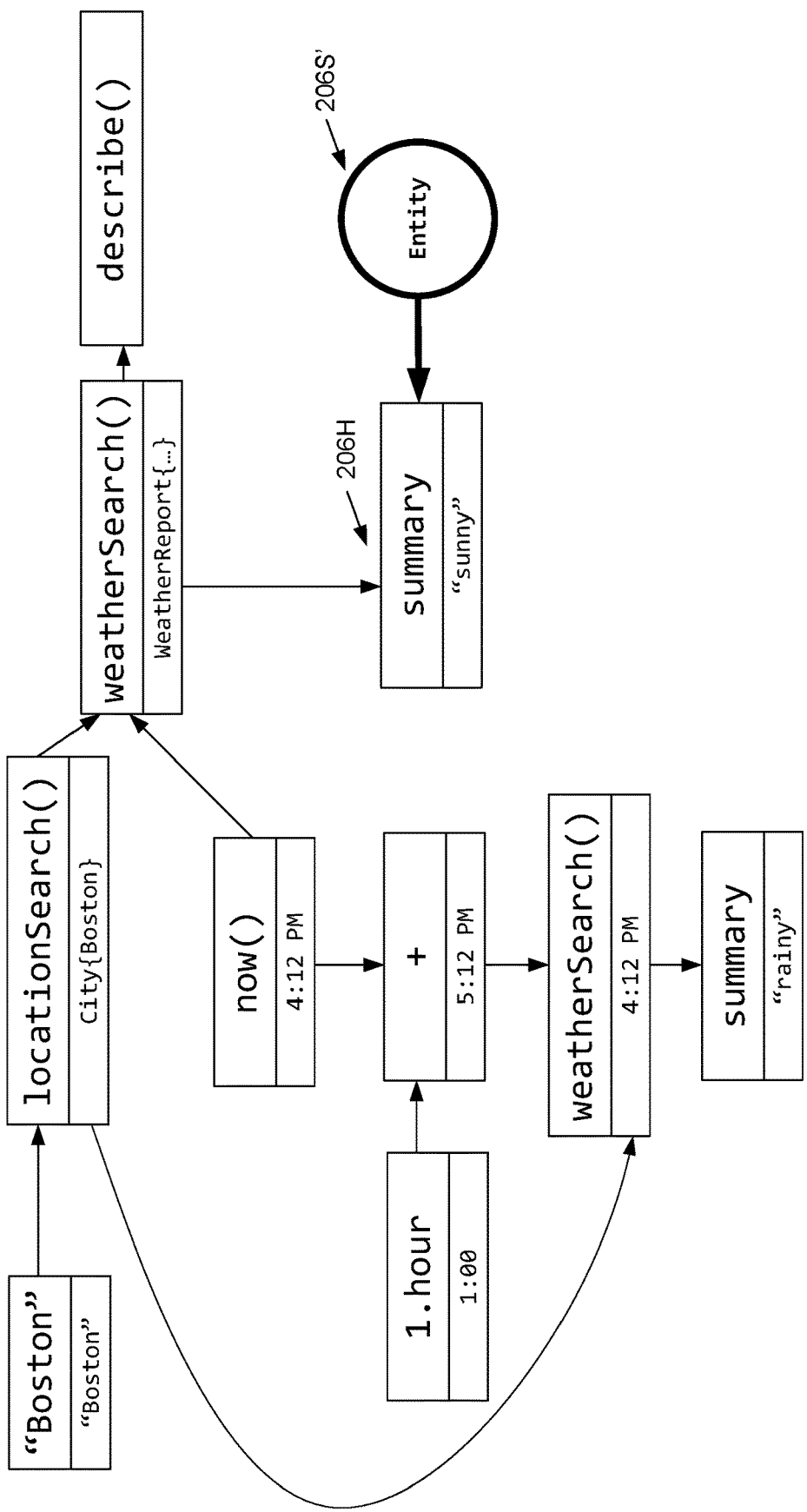

Accordingly, the template may be populated recursively by applying generation rules to other nodes in the data-flow graph. The descriptions may be obtained in any suitable order, for example, in left-to-right order according to the position in the template. For example, to handle the {Entity [weatherNow]} description, the generation model may be put into the state shown in FIG. 2G, configured to generate an "entity" symbol for the "summary" node 206H as indicated by the state indicator 206S'. As shown in FIG. 2G, the names mapped by the matcher of rule 1 are no longer indicated in the data-flow graph (i.e., the names bound by the matcher of rule 1 of FIG. 2C are not available to the matcher/body of other rules), but the extra data-flow graph nodes generated by executing the body of rule 1 remain present in the data-flow graph. Of the rules shown in FIG. 2C, only rule 2 applies (i.e., because only rule 2 has a matching symbol "entity" and an applicable matcher for "summary" content). Accordingly, applying rule 2 does not require executing any body code, and the template of rule 2 may be applied to produce a description including the text for the summary, e.g., "sunny."

The template for rule 2 of FIG. 2C does not include any other descriptions to fill in. Accordingly, the generation model is configured to return from the recursive call to the previous state (e.g., the state indicated in FIG. 2F). After returning from the recursive call, the generation model is configured to fill in part of the template from rule 1, using the results that were obtained from applying rule 2. For example, the template may be partially filled in to indicate, "It is sunny {Property [time]}, but {Entity [weatherNext]} starting {Property [timeNext]}." The template from rule 1 has additional descriptions to fill in, namely {Property [time]} and {Entity [weatherNext]}.

Figure 2H:
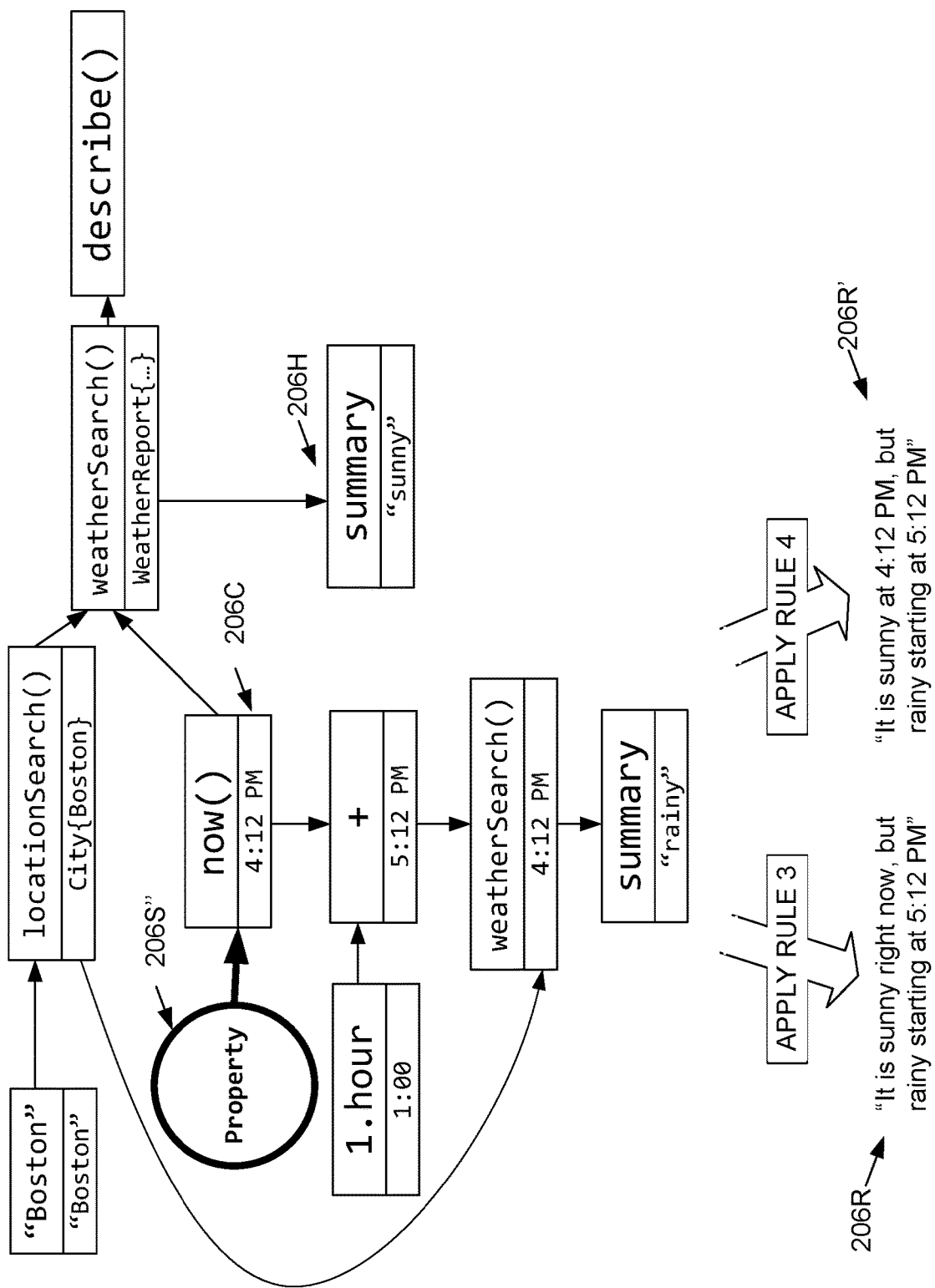

Accordingly, the generation model is configured to resume filling in the template from rule 1 of FIG. 2C by recursively generating other descriptions. FIG. 2H shows the state after filling in the hole for {Property [time]}, with the state indicator 206S" indicating the "property" symbol and the "now" node 206C. Both Rule 3 and Rule 4 are applicable to the time value, producing respectively: "right now" and "at 4:12 PM." Accordingly, the templates from rule 3 and rule 4 can be filled in to obtain two different candidate outputs which may be used for filling in the parent rule (e.g., rule 1). For example, rule 3 generates "It is sunny right now, but {Entity [weatherNext]} starting {Property [timeNext]}," whereas rule 4 generates "It is sunny at 4:12 PM, but {Entity [weatherNext]} starting {Property [timeNext]}." In some examples, as will be described below with regard to FIG. 2I, a specialized hypergraph data structure may be used to select candidate response utterances without explicitly enumerating every possible response utterance when applying each rule. For example, the hypergraph data structure may be traversed using an inference option to find a candidate response utterance, as will be described below.

For each of the remaining two descriptions to be filled in as indicated in the template of rule 1 (e.g., namely {Entity [weatherNext]} and {Property [timeNext]}), only a single rule from FIG. 2C applies. For example, only rule 2 applies to {Entity [weatherNext]} and only rule 4 applies to {Property [timeNext]}. Accordingly, each of the two candidates resulting from applying rule 3 and rule 4 to the {Property

[time]} value as shown in FIG. 2H can be filled in completely using the results of applying these rules. For example, rule 3 may be applied to produce response 206R stating: "It is sunny right now, but rainy starting at 5:12 PM," in which the current time is described with the phrase, "right now," as specified by rule 3. Alternately or additionally, rule 4 may be applied to produce response 206R', stating: "It is sunny at 4:12 PM, but rainy starting at 5:12 PM," in which the current time is explicitly described as "4:12 PM," as specified by rule 4. Accordingly, the final output from the generation model is the set of candidates: "It is sunny right now, but rainy starting at 5:12 PM," and "It is sunny at 4:12 PM, but rainy starting at 5:12 PM." When application of generation rules results in more than one candidate, a machine learning model may be used to select the best candidate in order to output a single response. Alternately or additionally, a set of candidates may be generated and shown to human demonstrators to obtain training data, for example by asking the human demonstrators to indicate a "best" response for responding to a user utterance, out of all of the different responses generated by using generation rules.

The above-described examples pertain to an exemplary scenario in which a conversational computing interface answers a question about the current weather. However, the described techniques may be used to produce descriptive content (e.g., natural language response utterances) for a variety of different topics and/or scenarios. For example, the described techniques may be used to answer domain-specific questions about any suitable topic (e.g., sports and/or entertainment). The described techniques may be used to generate descriptive content pertaining to any suitable information that may be accessed by a conversational computing interface in order to assist a user. For example, the described techniques may be used to generate descriptive content pertaining to information from any suitable API, search engine, and/or database, such as the weather results described above or any other suitable information. For example, the described techniques may be used to generate descriptive content pertaining to real-world people, places, and/or services. As another specific example, the described techniques may be used to generate descriptive content regarding availability or scheduling constraints of activities and/or services, and/or real-world effects related to the activities and/or services (e.g., sending an invitation or making a purchase). For example, the described techniques may be used to generate descriptive content pertaining to a result of scheduling a meeting, booking a restaurant reservation, and/or purchasing an airline ticket. Furthermore, although the above-described examples are with regard to producing a response utterance (e.g., an audible or visible natural language utterance), the described techniques may be used to produce any suitable descriptive content, for example, descriptive content for GUIs, and/or web search results.

The conversation model (e.g., including a code generator and/or content generation model) may be trained on training data, in order to learn how to generate computer-executable plans, select generation rules for producing candidate response utterances, and/or select candidate response utterances produced by generation rules. The generation model may include any suitable statistical model(s), AI model(s), ML model(s), and/or natural language model(s). For example, the generation model may include a previously-trained code generator configured for code generation, a generation rule model for generation rule application, and/or other models for implementing any of the other conversational computing interface functions and/or other computer operations described herein.

In some examples, the previously-trained generation model may include a previously-trained code generator configured to generate computer-executable plans. For example, the previously-trained code generator may be trained to generate one or more candidate computer-executable plans for responding to an event, for example with supervised training based on data indicating exemplary input events and suitable actions and/or response utterances for responding to the exemplary input events.

As a non-limiting example, the previously-trained code generator may be trained on one or more annotated dialogues. "Annotated dialogue" is used herein to refer to any suitable representation of an exemplary conversation between a human and a conversational computing interface (e.g., a dialogue), including any suitable annotations indicating actions that were taken by the conversational computing interface in response to events in the conversation. Generally speaking, annotations may include anything that is associated with an event (e.g., an utterance or other input from a human user participating in a dialogue), including but not limited to plans, results, response utterances by a conversational computing interface, and/or any suitable metadata (e.g., metadata indicating context in which the dialogue takes place or metadata indicating user satisfaction with a plan). An annotated dialogue may indicate desired behavior for a conversational computing interface, for example by including possible events that could occur in a conversation, along with an indication of actions that should be taken in order to respond to the events. Annotated dialogues may include events, actions, and accompanying response utterances in any suitable computer-readable representation.

The previously-trained generation model may be trained with regard to code generation (e.g., by training an included code generator) and/or with regard to producing response utterances by applying suitable generation rules (e.g., by training a statistical model, ML model, AI model, and/or NLP model as described above).

As a result of training on annotated dialogues, a conversational computing interface may be configured to respond to an event that occurs in a conversation with an appropriate action and response utterance. For example, the conversational computing interface may be trained to reproduce an action that was taken in response to the event in an annotated dialogue, while also being trained to produce a suitable accompanying response utterance based on a response utterance indicated in the annotated dialogue. As another example, the conversational computing interface may be trained to generate an action specifically for responding to the event, where the action was not necessarily indicated in any annotated dialogue. For example, the conversational computing interface may be trained to generate actions for events that were not included in any annotated dialogue, for example by generating an action that is similar to an action that was taken for some other event in an annotated dialogue.

Annotated dialogue(s) may be collected in any suitable manner, e.g., from historical data and/or generated by simulation. In some examples, annotated dialogues may be obtained from human users. For example, training data may be obtained from human users including human demonstrators, human engineers, and/or human users of a live conversational system, who may be instructed to provide exemplary events and/or actions for responding to the exemplary events. Irrespective of how annotated dialogues are obtained, an annotated dialogue including a computer-executable plan may be extended with additional exemplary response utterances, for example by applying generation rules to produce a plurality of candidate response utterances for the computer-executable plan, and selecting one or more of the candidate response utterances as a response utterance to include in the annotated dialogue. Additionally, the annotated dialogue may include one or more candidate response utterances that are indicated as inappropriate, e.g., to train the generation model to avoid producing such candidate response utterances. For example, the annotated dialogue may be extended with response utterances selected by human demonstrators as described above.

Application of generation rules may result in a plurality of different descriptions for a given data-flow graph node. As such, the generation model may produce a plurality of different candidate response utterances (e.g., in response to an input event and/or based on a computer-executable plan). Accordingly, the generation model may be trained to rank the candidate response utterances and/or to select a highest-ranked response utterance. In some examples, ranking candidate response utterances may be based on learning from data indicating suitable rankings for response utterances. For example, the data may include annotated dialogues that include one or more response utterances and an indication of quality of the response utterance (e.g., a score, an indication that a response utterance is suitable, and/or an indication that another response utterance may be unsuitable). As an example, an annotated dialogue may include a computer-executable plan with one or more "describe" operations, and human demonstrators may be asked to provide exemplary response description content for each "describe" operation. The human demonstrators may provide the exemplary response description content via any suitable interface.

As a non-limiting example, the human demonstrators may be asked to evaluate response utterances in a "flat annotation" interface wherein the human demonstrators are shown a list including a small number (e.g., 10-20) of complete candidate response utterances. For example, the candidate response utterances may be selected from a set of all possible candidate response utterances, and/or a pre-ranked selection of candidates that have a sufficiently high ranking according to a ranking function of the generation model (e.g., the 20 best candidates, and/or 20 candidates with at least a threshold ranking).

As another non-limiting example, the human demonstrators may be asked to evaluate response utterances in a "hierarchical annotation" interface wherein the human demonstrator is walked through a process of selecting one or more generation rules. For example, the human demonstrator may be shown the results of applying the selected generation rules to generate a description for a data-flow graph node. As an example, the user may be presented with an output representing one or more candidate generation rules. For example, rule 1 from FIG. 2C may be shown to the user as a text string indicating the natural-language template: "It is {Entity [weatherNow]} {Property [time]}, but {Entity [weatherNext]} starting {Property [timeNext]}." The user may select this natural-language template to use rule 1, or the user may select any other suitable natural-language template shown in the hierarchical annotation interface (e.g., using a rule not shown in FIG. 2C). The hierarchical annotation interface is configured to direct the user to select one of the values for filling in the selected natural-language template, e.g., the user may click on {Property [time]} to see the set of candidate expansions from applying different candidate rules (e.g., "right now" from applying rule 3, "at 4:12 PM" from applying rule 4, or any other suitable expansion from applying other rules not shown in FIG. 2C). The user may fill in each value in the template in this fashion, e.g., continuing to select a suitable expansion for the "{Entity [weatherNow]}," "{Entity [weatherNext]}," and "{Property [timeNext]}" values.

Using flat annotation, hierarchical annotation, or any other suitable user interface for evaluating response utterances, training data may be gathered to indicate, for different scenarios (e.g., different input events and/or different computer-executable plans), how to describe various concepts (e.g., how to describe any suitable values represented in a data-flow program). The training data may include complete utterances selected by human demonstrators, and/or sets of generation rules that were applied to derive the complete output utterances.

The generation model may be trained to automatically produce response utterances based on the training data. The generation model may include any suitable statistical model(s), AI model(s), ML model(s), and/or NLP model(s). For example, the model(s) may be configured for selecting, generating, and/or applying generation rules.

The generation model may include a weighted grammar (e.g., a formal language grammar) over generation rules, wherein each generation rule is assigned a weight score, and wherein response utterances may be ranked by generating a response utterance score for each utterance based on the weight scores. For example, the response utterance score for a response utterance may include a sum of scores of constituent rules used to generate the response utterance. In some examples, the weighted grammar may be implemented as a state machine including a state defined by a computer-executable plan (e.g., a data-flow graph), a node in the graph to describe, and/or a symbol indicating what kind of description to output (e.g., the state machine may maintain a state similar to the graphs shown in FIGS. 2A-2B and/or 2D-2H, and transition to different states by applying rules such as the rules shown in FIG. 2C).

The generation model may alternately or additionally include a recurrent neural network configured to assess a state vector embedding of any generation rules that have been applied while generating a description. The generation model may be configured to use the state vector embedding to predict a score for a rule application (e.g., using a linear model and/or a neural network model). The generation model may be configured to assess a new state vector by applying a transformation to the old state vector embedding, thereby assessing state-dependent scores for each rule application.

The generation model may alternately or additionally include a language model (e.g., any suitable NLP model) over output strings. In some examples, the language grammar may not be configured to directly evaluate generation rules. A language model may include any suitable function that assigns a probability score to any sequence of words, wherein a higher probability score may indicate more well-formed, grammatically correct, and/or statistically likely sentences. The language model can be trained on any suitable collection of utterances, for example on a collection of candidate response utterances generated by the generator model, and/or trained on a much larger corpus (e.g., an encyclopedia corpus) to learn general linguistic notions of well-formedness. The language model may be configured to produce a score for ranking candidate output utterances.

In some examples, in addition to the template features shown in FIG. 2C and described herein, natural-language templates may include distinguishing syntax for indicating whether rules make "content decisions" (e.g., whether or not to describe a particular attribute of a data-flow graph node), vs. "style decisions" regarding word choice and grammar (e.g., whether to say 'sunny' or 'nice out', or whether to say 'your meeting,' 'the meeting,' 'a meeting,' and/or 'an meeting'). In some examples, when templates distinguish style and content decisions, a language model may be configured for scoring different choices with regard to style decisions, while the language model may not be used to assess different choices with regard to content decisions (e.g., candidates with different content decisions may be considered in separate groups, with the language model being used to find response utterances with the best style choices in each group).

In some examples, the generation model may be configured to utilize features of a most recent user utterance and/or features of a complete history of user utterances to select response utterances that use similar language to the user, generally referred to as "linguistic accommodation." For example, the generation model may include one or more NLP model(s) configured to recognize similarity among linguistic features of utterances, and score candidate response utterances based on similarity to one or more user utterances.

Irrespective of the specific statistical, AI, ML, and/or NLP techniques employed in the generation model, the generation model may have one or more trainable parameters (e.g., rule weights, state transformation weights, linear models, and/or probability scores). The trainable parameters may be trained to assign a higher score (e.g., a highest possible score) to suitable response utterances indicated by human users (e.g., annotations provided by human demonstrators, and/or based on user feedback indicating user satisfaction). In some examples, the weights may be optimized using maximum-likelihood and/or maximum-margin objectives. In some examples, the weights may be optimized using local normalization, e.g., where rule choices are optimized with regard to each application of a single generation rule, and/or by global normalization, e.g., where rule choices are scored with regard to differences between complete derivations for complete response utterances. The weights may be trained using any suitable techniques, for example via gradient descent. Further examples of training/optimization are described further below with regard to FIG. 3.

The above-described models may use score rule application based on the identities of generation rules that are applied (e.g., wherein the identity of a generation rule is a feature of the model) and/or based on the content of response utterances generated by applying the rules (e.g., where the words/sentences in the response utterance are features of the model). Alternately or additionally, various dialogue-state-specific features can be used for training. For example, the generation model may be trained to recognize a salience score indicating the potential relevance of a feature of an attribute in a description. For example, the salience score may be based on how recently an attribute was last mentioned and/or whether there are other objects that may be described that have the same attribute value. As an example, an object that was recently mentioned may be unsuitable for inclusion in a description (e.g., indicating that a description of the object is of relatively low value for including in a response utterance and/or other description since the information in the description may be redundant), while an object that has not been mentioned lately and which is related to several other concepts in the conversation may be suitable for inclusion (e.g., because the information is likely useful and not likely to be redundant). Accordingly, when the generation model is configured to assess salience scores for attributes to be included in descriptions, the salience scores may be used to select generation rules in any suitable manner (e.g., selecting a generation rule that results in a response utterance that includes a description for attributes with a high salience score).

Using any suitable generation models as described above, a conversational computing interface may select a highest-ranked response utterance for describing a computer-executable plan being enacted to respond to an input event. In some examples, ranking the response utterances may be based on generating a plurality of response utterances, for example to score each response utterance and rank the response utterances based on the scores. In other examples, scoring and/or ranking response utterances may be based on an inference model configured to obtain one or more high-ranking response utterances without enumerating all of the candidate response utterances.

Figure 2I:
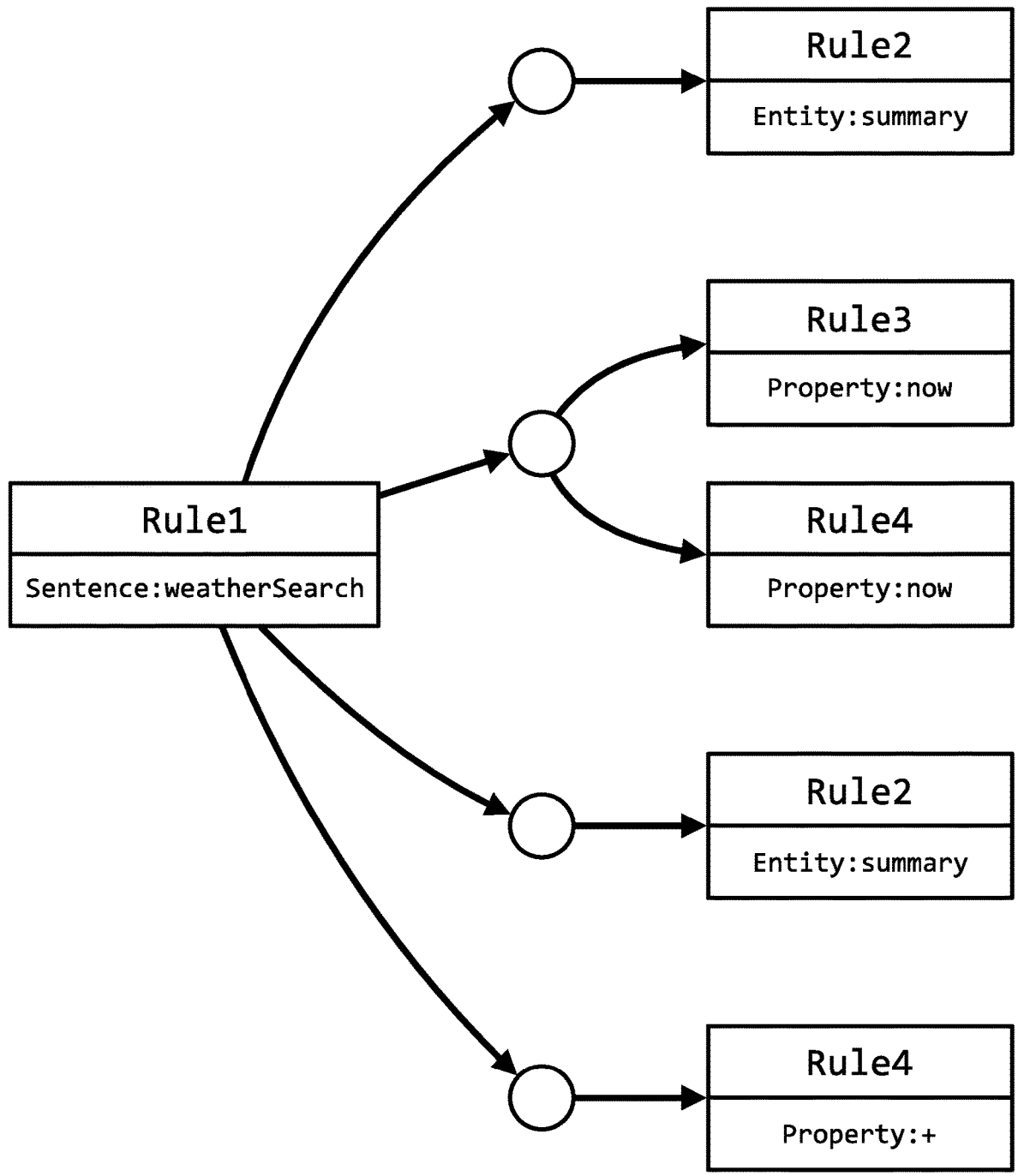

As a non-limiting example, although the examples described herein show the generation model producing output including a list of candidate response utterances, the generation model alternately or additionally may be operated to produce a weighted hypergraph of candidate response utterances, as shown in FIG. 2I. The hypergraph shown in FIG. 2I, in which weights are omitted for simplicity, shows a top-level application of rule 1, along with circular nodes representing each of the values to be filled in from the natural-language template of rule 1 (e.g., circular nodes represent choices between different generation rules). Each circular node is linked to one or more candidate rules that may be applied. The hypergraph represents the space of all possible outputs of the generation model (for a given input). Each vertex in the graph represents a partial derivation, i.e., a tree where some of the leaves are non-terminals in the grammar. Each edge represents a rule in the grammar, which is applied to a partial derivation to produce the next (possibly partial) derivation. The hypergraph shown in FIG. 2I has the structure of a tree, due to the generation rules in the example. However, the example is non-limiting and a hypergraph representation of candidate response utterances may have any suitable structure (e.g., including directed edges of any suitable arity, connecting any suitable number of hypergraph nodes, and/or including directed and/or undirected cycles). The hypergraph may be searched using standard inference algorithms and/or graph search algorithms, for example A* search and/or beam search.

In some examples, a conversational computing interface may be further configured to provide auto-complete functionality (e.g., an auto-complete tool) for human demonstrators to provide exemplary response utterances. For example, the conversational computing interface may be configured to generate a highest-ranked sentence that begins with the words 'The weather tomorrow . . . ' As another example, when annotators change rules in the generation grammar (e.g. by adding or removing text), the conversational computing interface may be configured to search for annotated strings that may need to be updated to be consistent with present rules. For example, the conversational computing interface may be configured to search for all the old annotated strings that are reachable under the new generation grammar but as close as possible to the old strings, either in terms of string similarity or the identities of the rules used. The generation model and/or components thereof (e.g., language model(s)) may be used to generate candidate strings for evaluating similarity to the old annotated strings, for example, by applying generation rules. In an example, finding similar annotated strings may include conducting a graph search (e.g., A* search and/or beam search on a hypergraph as described above with regard to FIG. 2I), parametrized by a cost function representing a magnitude of difference between old and new trees, a count of different rules applied in only one of the old and new trees, and/or any other suitable measure of tree similarity such as tree edit distance.

In some examples, annotated data may be outdated with regard to a desired configuration for a conversational computing interface. For example, annotated data may include a large number of dialogues (e.g., 10,000) in which meetings are referred to by name (e.g., a meeting named "Annual Review"); but developers may later desire to refer to meetings by time and/or participants (e.g., "meeting with Bill," "meeting at 2:00 PM," and/or "meeting with Bill at 2:00 PM"). Accordingly, the outdated annotated data may be updated to be consistent with the new desired configuration. In some cases, annotated data that may not be readily updated may be automatically discarded.

Accordingly, a conversational computing interface according to the present disclosure may include a generation migrator configured to automatically update annotated dialogues, for example by automatically updating response utterances in the annotated dialogues. As an example, a human user may specify a "source" regular expression to match one or more response utterances in order to find such matching source utterances. The human user may further specify a "target" regular expression that specifies a transformation for turning the matching source utterances into updated utterances. The matching source utterances may be found using any suitable techniques, e.g., using a standard regular expression engine. The regular expression engine may be used to produce transformed utterances based on the specified transformation. The conversational computing interface is configured to automatically find new sets of generation rules that may result in the transformed utterances. For example, automatically finding new generation rules may include inference techniques as described above (e.g., graph search on a weighted hypergraph).

As an example, a human user may specify an automatic update with a regular expression, for example by specifying a "find" regular expression: '(.*) meeting named ".*" (.*)'; and specifying a "replace" regular expression: '$1 meeting at.* with.* $2.' Accordingly, with a suitable generation grammar, the "find" and "replace" regular expressions may automatically transform the outdated response utterance 'Tomorrow you have a meeting named "Annual review"' into an updated response utterance 'Tomorrow you have a meeting at 2:00 PM with Bill.' As an example, the conversational computing interface may first predict that a viable replacement is based on a regular expression replacement, 'Tomorrow you have a meeting at.* with.*.', and then find a string in which the.*s can be replaced by any agent-producible text.

Returning to 114 of FIG. 1B, method 100 includes outputting a response. Such outputting of the response utterance may provide conversational assistance in many contexts, for example auto-complete for producing training data as described above. Although the examples described above are primarily concerned with generating synthesized speech or written text answering a user's question, these examples are non-limiting and the techniques described herein may be used for generating any suitable descriptive content. Furthermore, in addition to or instead of specifying what the agent should say next, individual generation rules may mention specific entities (e.g., names of contact book entries). Accordingly, the generation rules may produce structured outputs (e.g., computer-executable plans) that suggest follow-up questions that may be asked by a user in response to statements. For example, if a generation rule results in the name "Diane Smith," the generation rule may also be configured to produce one or more related follow-up questions that the user may be likely to ask (e.g., "Who does she manage?"), for example in order to prepare to answer such follow-up questions. Alternately, the generation rule may be configured to predict probable replies to a question, for example if the generation rule outputs a question "Would you like me to book it?" the generation rule may be further configured to predict that a likely answer to the question will be a user utterance, "Yes." For example, predicting follow-up questions and/or follow-up answers may be useful for auto-complete (e.g., for a user interface for producing training data) and/or to discover capabilities of the conversational computing interface. In some examples, in addition to being configured to produce descriptive output (e.g., utterance output text), utterance templates may be further configured to assess an alignment of the descriptive output to the computer-executable plan and/or data-flow graph (e.g., an alignment of one or more words in the descriptive output to one or more nodes of the data-flow graph). The alignment assessment may indicate any suitable features of the descriptive output, computer-executable plan, and/or data-flow graph. Accordingly, the alignment assessment may be used in any suitable manner for operating a conversational computing interface and/or training the conversational computing interface. For example, the alignment between the descriptive output and the data-flow graph may include an indication, for each data-flow node, of salience for later turns in a multi-turn conversation. For example, the alignment may include an assessment of salience for each existing node in the data-flow graph. Alternately or additionally, assessing the alignment may be based on indicating salience for new nodes that are added as part of an extended computer-executable plan of a generation rule used to produce the descriptive output. Alternately or in addition to indicating salience to later turns, the alignment may include any other suitable assessed quality related to the descriptive output, computer-executable plan, and/or data-flow graph. For example, the alignment may include assessed confidence values (e.g., indicating a confidence that a portion of the descriptive output is suitable for a corresponding portion of the computer-executable plan and/or data-flow graph).

The techniques of the present disclosure may be implemented in various ways. For example, as described above with regard to method 100, generating a response utterance at 106 may be based on applying one or more generation rules, e.g., based on finding generation rules having an applicable symbol and matcher. More generally, the techniques of the present disclosure may be applicable for generating response utterances, for example in situations where an initial computer-executable plan for responding to a conversational event results in an initial value that is by itself insufficient for responding to the conversational event. Accordingly, although examples are shown herein in which generating response utterances is based on applying generation rules having features (e.g., such as one or more symbol, matcher, body, and/or template feature(s)). The techniques presented herein may be used with any other suitable methodology for generating response utterances.

Figure 1C:
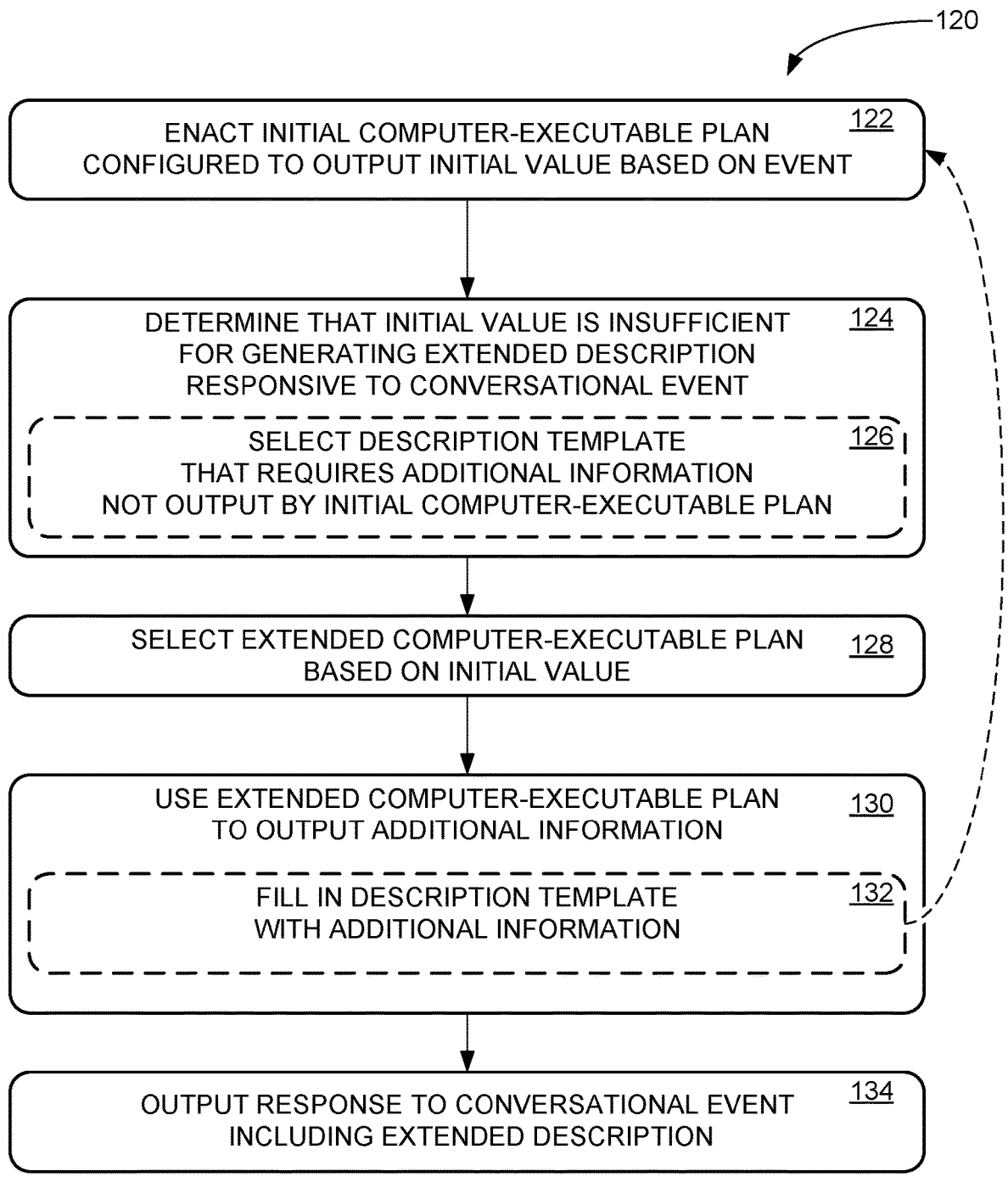

FIG. 1C shows another method 120 for producing a response utterance in response to a conversational event. As an example, the conversational event may include a natural language query, and accordingly the response utterance may include an answer to the query. More generally, method 120 may be used to output a response in the form of any suitable descriptive content related to an event, as described herein. For example, the response may include a natural language utterance in the form of text and/or generated speech, a graphical user interface presentation (e.g., an HTML page), and/or any other suitable response content. In some examples, the response utterance may be a portion of a larger piece of descriptive content (e.g., part of a larger response), for example, the response utterance may be a particular noun phrase, adjective phrase, or sentence, which may be included in a larger piece of descriptive content (e.g., a response made up of multiple different noun phrases, adjective phrases, and/or sentences).

At 122, method 120 includes enacting an initial computer-executable plan for responding to a conversational event. The initial computer-executable plan is configured to output an initial value based on the event. "Initial value" may be used herein to refer to any suitable data and/or metadata related to the initial computer-executable plan. For example, the initial value may be any suitable property relating to a data-flow program fragment of the initial computer-executable plan, such as a return value, a description of provenance of the return value (e.g., an API used to produce the return value), a description of the data-flow program fragment itself (e.g., a function name included in the data-flow program fragment), and/or any other suitable data resulting from generating and/or executing the computer-executable plan. The initial value may be based on a literal value, a mathematical calculation, and/or any other suitable function. As a non-limiting example, the initial value may be the result of an API call issued by the initial computer-executable plan. In other examples, the initial value may not be the result of an API call, and/or the initial value may be the result of additional computations in addition to an API call. More generally, the initial value may be any result obtained by executing any suitable computer-executable plan, including any suitable computational step(s) (e.g., any suitable computer operations configured to perform calculations, control computer hardware device, and/or interact with other computer systems).

At 124, method 120 includes determining that the initial value is insufficient for generating an extended description responsive to the conversational event. For example, as illustrated at 126, the extended description may be generated by selecting, based on the initial value, a description template for outputting the extended description. However, the description template may require additional information that is not output by the initial computer-executable plan.

At 128, method 120 includes selecting an extended computer-executable plan based on the initial value. In some examples, the extended computer-executable plan may be selected based on determining that the initial value is insufficient for generating the extended description responsive to the conversational event. For example, the extended computer-executable plan may be a computer-executable plan that is configured to output additional information suitable for filling in a description template. The extended computer-executable plan may be selected using any suitable techniques, for example, based on generating one or more extended computer-executable plans that are configured to output data having a datatype corresponding to the additional information.

Selecting templates and/or computer-executable plans related to the initial value may be performed in any suitable fashion. For example, selecting a description template and/or selecting the extended computer-executable plan may be based on selecting an applicable generation rule of a plurality of generation rules, wherein the applicable generation rule defines both of the description template and/or the extended computer-executable plan (e.g., as the "body" of the generation rule). The selection may be based on any feature of the initial value, e.g., an actual evaluation result or provenance data, as described above with regard to generation rules. As a non-limiting example, for an initial value that is a time of day, the description template(s) and/or extended computer-executable plan(s) may be selected based on the time of day being any time value (e.g., any value with a compatible data type), a specific time (e.g., "4:00 PM"), and/or within a specific range of times (e.g., anytime in the afternoon or anytime between 5:00 PM and 5:30 PM). Alternately or additionally, the description template(s) and/or extended computer-executable plan(s) may be selected based on the time of day resulting from a specific literal value and/or function. For example, the selection may be based on whether the time of day was specified as a literal value, specified using the "now( )" function, or retrieved as a result of an API call. The selection may be made at any level of granularity. In some examples, based on determining that the initial value is a time resulting from an API call, the selection may be further based on the specific API call. For example, a different selection may be made for a next available reservation time for a restaurant as compared to a next available ride in a ride hailing service or a next available flight booking for an airline.

In some examples, as described above, selecting an applicable generation rule may be based on recognizing a syntactic symbol indicating a syntactic role of the response to the conversational event. For example, as described above, different symbols may be used to generate sentences, entities, properties, and/or descriptive content fitting any other suitable syntactic role. Accordingly, the plurality of generation rules may be filtered to select the applicable generation rule from a subset of generation rules that have a matching syntactic symbol.

In some examples, selecting the applicable generation rule of the plurality of generation rules includes assessing, for each candidate generation rule of a plurality of generation rules, a correspondence between the initial value and a plan matcher of the candidate generation rule. For example, the plan matcher may be a "matcher" as described above with regard to generation rules. The plan matcher may be configured to match the initial value output by the computer-executable plan and/or the computer-executable plan itself in any suitable manner. In examples, a correspondence to the initial value may be assessed based on matching specific data values, based on matching any value of a specific data type, based on provenance of data values, and/or any based on other suitable structural features of the initial computer-executable plan and/or initial value. For example, the plan matcher may be configured to match a specific value, any value of a predefined data type, any value that satisfies a computer-executable predicate function (e.g., any value within a range of values, and/or any value satisfying a particular mathematical property, or more generally, any value with a specific property that the computer-executable predicate function is configured to assess). In some examples, the computer-executable plan may be extended based on a matcher of a generation rule (e.g., to assess the correspondence to the initial value), in addition to being extended based on the body of a generation rule.

In some examples, as described above, the plan matcher may be configured to match features of the initial value that was output by the computer-executable plan (e.g., matching specific value, value matching a predicate, data type and/or format of the initial value). For example, the plan matcher may be configured to match values based on a computer-executable predicate function defined with regard to any value of a predefined data type. Alternately or additionally, in some examples, the plan matcher may be configured to match one or more structural features of the initial computer-executable plan itself (e.g., instead of or in addition to matching features of the initial value that is output by the initial computer-executable plan). As a non-limiting example, the plan matcher may be configured to match computer-executable plans that include a particular function (e.g., a function to get user input, a particular calculation and/or a particular API call). As another non-limiting example, the plan matcher may be configured to match computer-executable plans that include one or more functions arranged in a particular graph-theoretic structure (e.g., any tree structure, any tree structure having a particular arrangement of nodes, a directed acyclic graph structure, and/or any other structure that may be defined/assessed based on graph-theoretic techniques). Alternately or additionally, the plan matcher may be configured to match against any other structural feature(s) of the computer-executable plan and/or data-flow graph, e.g., based on the syntactic elements of the computer-executable plan, graph structure elements of the data-flow graph, and/or any other features of computer-executable plans and/or data-flow graphs described herein. For example, the plan matcher may include computer-executable code configured to assess computer-executable plans in any suitable syntax and/or data-flow graphs in any suitable data structure representation.

At 130, method 120 includes using the extended computer-executable plan to output the additional information. The additional information may be used for generating an extended description for responding to the conversational event. For example, the additional information may be used for filling in a description template as illustrated at 132.

In some examples, a description template may indicate one or more sub-descriptions to be filled in, wherein each sub-description may be generated based on a value computed by the extended computer-executable plan and/or the initial computer-executable plan. For example, the templates shown in FIGS. 2A-2I are recursively filled by generating a new description for each field of each template that is used, e.g., the "{Entity [weatherNow]}" and "{Property [time]}" fields of rule 1 of FIG. 2C are filled in by recursively applying other rules to generate further descriptions. Accordingly, method 120 may further include recursively filling the description template with further-additional information. For example, as illustrated by the dashed line from 132 to 122, after partially filling in the description template based on the additional information, method 120 may return to 122 to enact further computer-executable plans to compute further values. As shown, method 120 may enact the further initial computer-executable plan(s) and optionally, further extended computer-executable plan(s) in order to compute each piece of further-additional information. For example, as described above with regard to FIGS. 2A-2I, populating the template from Rule 1 in FIG. 2C may include applying additional generation rules, including executing further computer-executable plans defined by the additional computer-executable code in the rule matchers and/or rule bodies.

At 134, method 120 includes outputting a response to the conversational event including the extended description. For example, the response may include the description template filled in with the additional information. For example, with regard to the description generation shown in FIGS. 2A-2I, the response may be based on filling in each field of a description template according to the description template defined by generation rule 3 as shown in response 206R of FIG. 2H. In some examples, method 120 may further include outputting additional, alternative responses based on other generation rules, as with response 206R' of FIG. 2H resulting from using the description template of rule 4 instead of rule 3.

The extended computer-executable plan may be configured to perform any suitable steps to obtain the additional information. As an example, the initial value may be a result of an API call that may have resulted in relevant, but insufficient information for responding to the conversational event. In some examples, an answer to a further API call may be suitable for determining additional information for responding to the event. For example, in the examples described above with regard to FIGS. 2A-2I, an initial API call to a weather service results in relevant information (e.g., that the weather is sunny at a particular time) but the initial API call does not reveal additional information, such as the likelihood of rain later. Accordingly, the extended computer-executable plan may be configured to issue the further API call to retrieve the answer to the further API call.

In some examples, the response to the conversational event may be selected from a plurality of candidate responses. Accordingly, method 120 may be operated to output a plurality of candidate responses to the conversational event. Each candidate response may be based on one of a plurality of different description templates, wherein each different description template is filled in within information from a corresponding extended computer-executable plan (e.g., a computer-executable plan specified by a rule body of a generation rule associated with the description template). Accordingly, the response to the conversational event may be selected from the plurality of candidate responses in any suitable fashion, for example based on assessing a score for each different candidate response and selecting a response having a highest score of the plurality of candidate responses.

Alternately or additionally, the response may be selected based on assessing, for each different candidate response, a score of a description template associated with the response, and outputting a response having a highest aggregate score of one or more associated description templates. For example, the aggregate score for a response may be based on any suitable aggregation function, such as a sum, product, and/or mean (e.g., arithmetic mean, geometric mean, harmonic mean, and/or any other suitable mean) of scores assessed for each description template associated with each generation rule used to produce the response. As described above, scoring responses, templates, and/or generation rules may be based on training with training data indicating exemplary user utterances and suitable response utterances. In some examples, an aggregate score of one or more associated description templates may be calculated based on evaluating all of the one or more associated description templates as an aggregate (e.g., as compared to evaluating a separate score for each associated description template and aggregating the score). For example, as described herein, a machine learning and/or artificial intelligence model may be operated to evaluate a score of one or more associated description templates.

In some examples, generation rules may be used to build custom user interfaces for presenting data (e.g., a GUI for presenting results of a database query) and/or presenting choices to a user (e.g., an interactive list of hotel listings with "book" and/or "cancel" buttons). As an example, instead of generating response utterances as natural language text, generation rules may be configured with templates that specify fragments of a suitable structured interface language (e.g., HTML and/or Microsoft AdaptiveCard™).

In some examples, generation rules may be configured to include, instead of or in addition to natural language text, text-to-speech data such as prosody markers, style tokens, or any other suitable data for indicating how to pronounce and/or audibly output natural language content. For example, the generation rules may be configured to specify locations in a computer-readable string that should be pronounced in a distinct way (e.g., abbreviations that should be pronounced in unabbreviated form, and/or eliding long sequences of numbers from spoken output).

As described above, a conversational computing interface may be configured to generate different actions specific to different events that occur, thereby responding appropriately in novel situations. Accordingly, using the techniques of the present disclosure, the conversational computing interface may output relevant responses including descriptions of the actions and results of the actions.

As another example, there may be multiple different descriptions that all adequately describe a computer-executable plan and/or results thereof, and accordingly it may be desirable for a conversational computing interface to be able to generate the multiple different descriptions for use in different specific contexts. For example, the conversational computing interface may be configured to receive a language-specific input utterance in any of a plurality of languages (e.g., English, Spanish, and/or Chinese). Accordingly, it may be desirable for the conversational computing interface to enact a language-agnostic computer-executable plan based on the input utterance, and to produce a language-specific response utterance in the same language as the language-specific input utterance.

By outputting descriptions based on a computer-executable plan that was enacted, a conversational computing interface may be configured to be truthful and/or trustworthy. For example, the conversational computing interface may be configured to avoid claiming to have taken any action that was not actually taken (e.g., by executing suitable computer-executable plans). Similarly, the conversational computing interface may be configured to avoid stating that a result of a computation is different from a value that was actually computed. Furthermore, the conversational computing interface may be configured to output complete, accurate information about actions that may have real-world side effects that a user should be aware of. As an example, if a user asks to book a flight to Boston, the conversational computing interface may be configured to ensure that if any flight is booked, the response utterance will unambiguously describe that the flight was booked and relevant details (e.g., price). For example, the conversational computing interface may be configured to avoid scenarios where the flight is booked but the user is not told, scenarios in which a flight is booked but the price is not mentioned or is described inaccurately, and/or scenarios where the user is told a flight was booked when no flight was actually booked. Instead, a conversational computing interface according to the present disclosure may be configured to output relevant, accurate information regarding actions performed by the conversational computing interface.

A conversational computing interface according to the present disclosure is not constrained to describe only the literal result requested by the user. Instead, the conversational computing interface is further able to take additional actions and perform supplementary computations (e.g., warn if the weather is likely to change soon after the requested time as described above with regards to FIGS. 2A-2I). As another example, if a user asks "Is Jane invited to the 3:00 product meeting?" if Jane is invited but declined the invitation, the conversational computing interface is configured to output relevant information (e.g., "Yes, she is invited, but she declined the invitation") instead of merely answering the initial question (e.g., merely saying "Yes, she is invited," if it is already known that she has declined).

A conversational interface according to the present disclosure may facilitate authoring of new actions and/or responses, for example by allowing human engineers and/or human demonstrators with any suitable level of training to provide training data indicating what the conversational computing interface should say in different situations and/or when particular response utterances are appropriate.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 3:
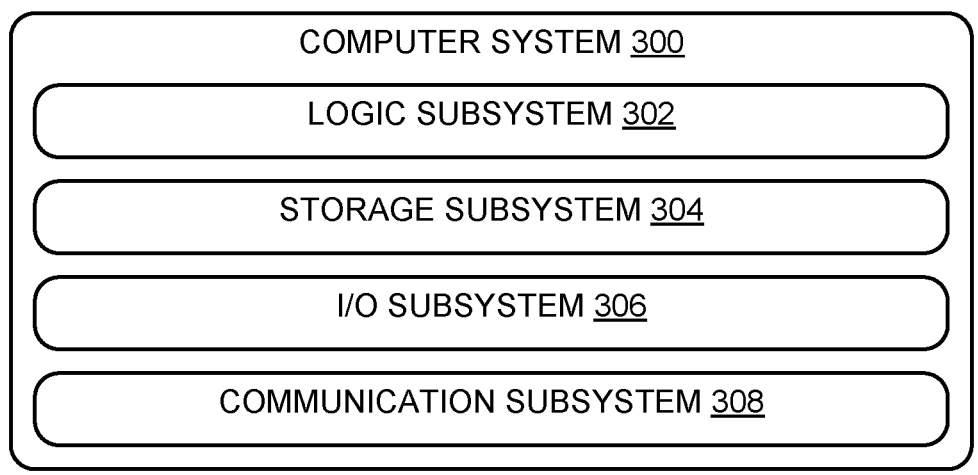
FIG. 3 shows an exemplary computing system.

FIG. 3 schematically shows a simplified representation of a computing system 300 configured to provide any to all of the compute functionality described herein. Computing system 300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 300 includes a logic subsystem 302 and a storage subsystem 304. Computing system 300 may optionally include an input/output subsystem 306, communication subsystem 308, and/or other subsystems not shown in FIG. 3.

Logic subsystem 302 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 304 includes one or more physical devices configured to temporarily and/or permanently hold computer information such as data and instructions executable by the logic subsystem. When the storage subsystem includes two or more devices, the devices may be collocated and/or remotely located. Storage subsystem 304 may include volatile, nonvolatile, dynamic, static, read/write, read-only, random-access, sequential-access, location-addressable, file-addressable, and/or content-addressable devices. Storage subsystem 304 may include removable and/or built-in devices. When the logic subsystem executes instructions, the state of storage subsystem 304 may be transformed—e.g., to hold different data.

Aspects of logic subsystem 302 and storage subsystem 304 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. For example, conversational computing interface 10 and/or previously-trained conversation model 12 may each be implemented as one or more machines.

When included, input/output subsystem 306 may include one or more display devices utilizing virtually any type of technology. In some implementations, display subsystem may include one or more virtual-, augmented-, or mixed reality displays. which may be used to present a visual representation of data held by storage subsystem 304. This visual representation may take the form of a graphical user interface (GUI). Alternately or additionally, input/output subsystem 306 may include a speaker, which may be used to output an audible representation of data held by storage subsystem 304, for example, via speech output.

When included, input/output subsystem 306 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 208 may be configured to communicatively couple computing system 200 with one or more other computing devices. Communication subsystem 208 may include wired and/or wireless communication devices compatible with one or more different communication protocols. The communication subsystem may be configured for communication via personal-, local- and/or wide-area networks.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computer-implemented method of responding to a conversational event comprises enacting, by a conversational computing interface, an initial computer-executable plan based on a conversational event received by the conversational computing interface, wherein the initial computer-executable plan is configured to output an initial value based on the conversational event. In this or any other example, the method further comprises selecting, by the conversational computing interface based on the initial value, a description template that requires additional information not output by the initial computer-executable plan. In this or any other example, the method further comprises selecting, by the conversational computing interface based on the initial value, an extended computer-executable plan configured to output the additional information. In this or any other example, the method further comprises enacting, by the conversational computing interface, the extended computer-executable plan to fill in the description template with the additional information. In this or any other example, the method further comprises outputting, via the conversational computing interface, a response to the conversational event based on the description template filled in with the additional information. In this or any other example, the initial value is a result of an application programming interface (API) call issued by the initial computer-executable plan, the additional information includes an answer to a further API call, and the extended computer-executable plan is configured to issue the further API call to retrieve the answer to the further API call. In this or any other example, the method further comprises recursively enacting further-extended computer-executable plans to recursively output further-additional information and further fill the description template with the further-additional information. In this or any other example, selecting the description template and selecting the extended computer-executable plan are based on selecting an applicable generation rule of a plurality of generation rules, wherein the applicable generation rule defines the description template and the extended computer-executable plan. In this or any other example, selecting the generation rule of the plurality of generation rules includes recognizing a syntactic symbol indicating a syntactic role of the response to the conversational event, and filtering the plurality of generation rules to select the applicable generation rule from a subset of generation rules having a matching syntactic symbol. In this or any other example, selecting the applicable generation rule of the plurality of generation rules includes assessing, for each candidate generation rule of the plurality of generation rules, a correspondence between the initial value output by the initial computer-executable plan and a plan matcher of the candidate generation rule. In this or any other example, the plan matcher is configured to match any value that satisfies a computer-executable predicate function defined for values of a predefined data type. In this or any other example, the plan matcher is configured to match one or more structural features of the initial computer-executable plan. In this or any other example, the plan matcher is configured to match a specific value. In this or any other example, the method further comprises outputting a plurality of candidate responses to the conversational event based on a plurality of different description templates, each different description template filled in with information from a corresponding extended computer-executable plan. In this or any other example, the method further comprises assessing a score for each different candidate response and outputting the response having a highest score of the plurality of candidate responses. In this or any other example, the method further comprises assessing, for each different candidate response, a score of a description template associated with the response and outputting the response having a highest aggregate score of one or more associated description templates.

In an example, a computer-implemented method of responding to a conversational event comprises enacting, by a conversational computing interface, an initial computer-executable plan based on a conversational event received by the conversational computing interface, wherein the initial computer-executable plan is configured to output an initial value based on the conversational event. In this or any other example, the method further comprises selecting, by the conversational computing interface, an extended computer-executable plan based on determining that the initial value is insufficient for generating an extended description responsive to the conversational event. In this or any other example, the method further comprises enacting, by the conversational computing interface, the extended computer-executable plan to output additional information beyond what the initial computer-executable plan is configured to output, the additional information sufficient for generating the extended description responsive to the conversational event. In this or any other example, the method further comprises outputting, via the conversational computing interface, a response to the conversational event including the extended description. In this or any other example, the method further comprises selecting, based on the initial value, a description template that requires the additional information, wherein the response to the conversational event is based on the description template filled in with the additional information. In this or any other example, the initial value is a result of an application programming interface (API) call issued by the initial computer-executable plan, the additional information includes an answer to a further API call, and the extended computer-executable plan is configured to issue the further API call to retrieve the answer to the further API call. In this or any other example, the method further comprises filling a description template with the additional information. In this or any other example, the method further comprises recursively enacting further-extended computer-executable plans to recursively output further-additional information, and filling the description template with the further-additional information. In this or any other example, selecting the extended computer-executable plan includes recognizing a syntactic symbol indicating a syntactic role of the response to the conversational event. In this or any other example, selecting the extended computer-executable plan includes filtering a plurality of generation rules to select an applicable generation rule from a subset of generation rules having a matching syntactic symbol, wherein the applicable generation rule defines the extended computer-executable plan. In this or any other example, selecting the extended computer-executable plan includes assessing, for each candidate generation rule of a plurality of generation rules, a correspondence between the initial value and a plan matcher of the candidate generation rule, wherein an applicable generation rule defines the extended computer-executable plan. In this or any other example, the method further comprises outputting a plurality of candidate responses to the conversational event based on filling in a plurality of different description templates, wherein each different description template is filled in with information from a corresponding extended computer-executable plan.

In an example, a conversational computing interface system, comprises a logic device, and a storage device holding instructions executable by the logic device. In this or any other example, the instructions are executable to instantiate a conversational computing interface. In this or any other example, the instructions are further executable to enact, by the conversational computing interface, an initial computer-executable plan based on a conversational event received by the conversational computing interface, wherein the initial computer-executable plan is configured to output an initial value based on the conversational event. In this or any other example, the instructions are further executable to select, by the conversational computing interface, an extended computer-executable plan based on determining that the initial value is insufficient for generating an extended description responsive to the conversational event. In this or any other example, the instructions are further executable to enact, by the conversational computing interface, the extended computer-executable plan to output additional information beyond what the initial computer-executable plan is configured to output, the additional information sufficient for generating the extended description responsive to the conversational event. In this or any other example, the instructions are further executable to output, via the conversational computing interface, a response to the conversational event including the extended description.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A computer-implemented method of responding to a conversational event, comprising:
    enacting, by a conversational computing interface, an initial computer-executable plan based on a conversational event received by the conversational computing interface, wherein the initial computer-executable plan is configured to output an initial value based on the conversational event;
    selecting, by the conversational computing interface based on the initial value, a description template that requires additional information not output by the initial computer-executable plan;
    selecting, by the conversational computing interface based on the initial value, an extended computer-executable plan configured to output the additional information;
    enacting, by the conversational computing interface, the extended computer-executable plan to fill in the description template with the additional information;
    outputting a plurality of candidate responses to the conversational event based on a plurality of different description templates, each different description template filled with additional information from a corresponding extended computer-executable plan; and
    outputting, via the conversational computing interface, a response to the conversational event based on one of the different description templates filled in with additional information.

2. The computer-implemented method of claim 1, wherein the initial value is a result of an application programming interface (API) call issued by the initial computer-executable plan, the additional information includes an answer to a further API call, and the extended computer-executable plan is configured to issue the further API call to retrieve the answer to the further API call.

3. The computer-implemented method of claim 1, further comprising recursively enacting further-extended computer-executable plans to recursively output further-additional information and further fill the description template with the further-additional information.

4. The computer-implemented method of claim 1, wherein selecting the description template and selecting the extended computer-executable plan are based on selecting an applicable generation rule of a plurality of generation rules, wherein the applicable generation rule defines the description template and the extended computer-executable plan.

5. The computer-implemented method of claim 4, wherein selecting the generation rule of the plurality of generation rules includes recognizing a syntactic symbol indicating a syntactic role of the response to the conversational event, and filtering the plurality of generation rules to select the applicable generation rule from a subset of generation rules having a matching syntactic symbol.

6. The computer-implemented method of claim 4, wherein selecting the applicable generation rule of the plurality of generation rules includes assessing, for each candidate generation rule of the plurality of generation rules, a correspondence between the initial value output by the initial computer-executable plan and a plan matcher of the candidate generation rule.

7. The computer-implemented method of claim 6, wherein the plan matcher is configured to match any value that satisfies a computer-executable predicate function defined for values of a predefined data type.

8. The computer-implemented method of claim 6, wherein the plan matcher is configured to match one or more structural features of the initial computer-executable plan.

9. The computer-implemented method of claim 6, wherein the plan matcher is configured to match a specific value.

10. The computer-implemented method of claim 1, further comprising assessing a score for each different candidate response and outputting the response having a highest score of the plurality of candidate responses.

11. The computer-implemented method of claim 1, further comprising assessing, for each different candidate response, a score of a description template associated with the response and outputting the response having a highest aggregate score of one or more associated description templates.

12. A computer-implemented method of responding to a conversational event, comprising:
    enacting, by a conversational computing interface, an initial computer-executable plan based on a conversational event received by the conversational computing interface, wherein the initial computer-executable plan is configured to output an initial value based on the conversational event;
    selecting, by the conversational computing interface, an extended computer-executable plan based on determining that the initial value is insufficient for generating an extended description responsive to the conversational event;

enacting, by the conversational computing interface, the extended computer-executable plan to output additional information beyond what the initial computer-executable plan is configured to output, the additional information sufficient for generating the extended description responsive to the conversational event;

outputting a plurality of candidate responses to the conversational event based on filling in a plurality of different description templates, wherein each different description template is filled in with information from a corresponding extended computer-executable plan; and outputting, via the conversational computing interface, a response to the conversational event including the extended description based on one of the different description templates filled in with the additional information.

13. The computer-implemented method of claim 12, further comprising selecting, based on the initial value, a description template that requires the additional information, wherein the response to the conversational event is based on the description template filled in with the additional information.

14. The computer-implemented method of claim 12, wherein the initial value is a result of an application programming interface (API) call issued by the initial computer-executable plan, the additional information includes an answer to a further API call, and the extended computer-executable plan is configured to issue the further API call to retrieve the answer to the further API call.

15. The computer-implemented method of claim 12, further comprising:
   filling a description template with the additional information;
   recursively enacting further-extended computer-executable plans to recursively output further-additional information; and
   filling the description template with the further-additional information.

16. The computer-implemented method of claim 12, wherein selecting the extended computer-executable plan includes:
   recognizing a syntactic symbol indicating a syntactic role of the response to the conversational event; and
   filtering a plurality of generation rules to select an applicable generation rule from a subset of generation rules having a matching syntactic symbol, wherein the applicable generation rule defines the extended computer-executable plan.

17. The computer-implemented method of claim 12, wherein selecting the extended computer-executable plan includes assessing, for each candidate generation rule of a plurality of generation rules, a correspondence between the initial value and a plan matcher of the candidate generation rule, wherein an applicable generation rule defines the extended computer-executable plan.

18. A conversational computing interface system, comprising:
   a logic device; and
   a storage device holding instructions executable by the logic device to:
      instantiate a conversational computing interface;
      enact, by the conversational computing interface, an initial computer-executable plan based on a conversational event received by the conversational computing interface, wherein the initial computer-executable plan includes computer-executable bytecode in a data-flow programming language, and wherein the initial computer-executable plan is configured to output an initial value based on the conversational event;
      select, by the conversational computing interface, an extended computer-executable plan including additional data-flow program fragments based on determining that the initial value is insufficient for generating an extended description responsive to the conversational event;
      enact, by the conversational computing interface, the extended computer-executable plan to output additional information beyond what the initial computer-executable plan is configured to output, the additional information sufficient for generating the extended description responsive to the conversational event; and
      output, via the conversational computing interface, a response to the conversational event including the extended description.

* * * * *